United States Patent [19]

Gorday et al.

[11] Patent Number: 5,603,088
[45] Date of Patent: Feb. 11, 1997

[54] METHOD AND APPARATUS FOR DETERMINING A QUALITY LEVEL OF AN ANALOG SIGNAL IN A RADIO COMMUNICATION SYSTEM

[75] Inventors: Paul E. Gorday, Boynton Beach; Satyamurti Sunil, Delray, both of Fla.

[73] Assignee: Motorola, Inc., Schaumburg, Ill.

[21] Appl. No.: 397,322

[22] Filed: Feb. 28, 1995

[51] Int. Cl.⁶ .............................. H04B 1/04; H04B 1/16; H04B 17/00
[52] U.S. Cl. .................... 455/53.1; 455/45; 455/54.1; 455/67.1; 455/226.2; 455/102; 340/825.44
[58] Field of Search .................... 455/45, 53.1, 54.1, 455/54.2, 61, 63, 67.1, 67.7, 68, 70, 102, 226.1–226.3; 340/311.1, 825.44; 370/11; 381/14, 16; 375/216

[56] References Cited

U.S. PATENT DOCUMENTS

| | | |
|---|---|---|
| 4,621,366 | 11/1986 | Cain et al. . |
| 4,630,266 | 12/1986 | Deparis et al. . |
| 4,825,193 | 4/1989 | Siwiak et al. . |
| 4,891,637 | 1/1990 | Siwiak et al. . |
| 4,939,731 | 7/1990 | Reed et al. . |
| 4,991,184 | 2/1991 | Hashimoto . |
| 5,303,408 | 4/1994 | Ghomeshi et al. . |
| 5,428,610 | 6/1995 | Davis ................................. 455/45 X |
| 5,465,396 | 11/1995 | Hunsinger et al. .................. 455/61 |

FOREIGN PATENT DOCUMENTS 788400  1/1979  U.S.S.R. .

OTHER PUBLICATIONS

"An Overlap–Add Technique Based on Waveform Similarity (WSOLA) for High Quality Time–Scale Modification of Speech" by Werner Verhelst & Marc Roelands, 1993 IEEE, pp. II–554–II–557.

Primary Examiner—Chi H. Pham
Attorney, Agent, or Firm—James A. Lamb

[57] ABSTRACT

A radio transmitter (103) transmits a cycle (320) including a digital portion (330) generated by frequency modulating a radio carrier with a digital signal and an analog portion (440) generated by amplitude modulating a radio carrier with an analog signal. A selective call radio (106) frequency demodulates the digital signal; amplitude demodulates the analog signal; decodes a message address (510); generates a quality signal indication (643) while a quality assessment signal (420) is being received; processes an information signal (550) in response to a message received signal (641); records at least one measurement of the quality assessment signal (420) during the quality signal indication (643); determines a signal quality level of the information signal (550) from the at least one measurement of the quality assessment signal (420); and generates a sensible alert in response to the signal quality level.

20 Claims, 12 Drawing Sheets

METHOD AND APPARATUS FOR DETERMINING A QUALITY LEVEL OF AN ANALOG SIGNAL IN A RADIO COMMUNICATION SYSTEM

FIELD OF THE INVENTION

This invention relates in general to determining a quality level of an analog signal, and in particular to determining noise and distortion in an audio signal transmitted by modulating a portion of a frame of a radio signal used in a radio communication system having a synchronous protocol.

BACKGROUND OF THE INVENTION

Known means of determining a quality level of an analog transmission link include, for example, a technique of measuring an average signal strength of an intermediate frequency stage in a radio receiver to establish an audio squelch signal. The technique uses a measurement of a radio frequency (RF) carrier to infer the quality of the analog signal during the use of the link. The technique of deriving a squelch signal, while being simple and widely used, suffers from some deficiencies, amongst which is that the squelch signal can indicate a good audio signal when the audio signal is distorted but while the RF carrier is strong, for example, when the desired signal is interfered with by an adjacent channel RF signal. In a related example, a test signal used in a setup of a telephone modem link determines a quality level of the telephone link at the setup time of the link. Some modem techniques use a predetermined audio signal. This modem setup technique determines a quality level for the link at the time of setup, but not generally thereafter, and is normally for the use of a analog telephone link for the transmission of data. The quality of the telephone link after setup is generally determined by digital methods such as bit error rate.

Neither of these techniques solve the problem of accurately measuring the quality of an analog signal while it is being transmitted over a radio link, and in particular, are not readily adaptable to accurately measuring the quality of a voice signal over a radio link. Being able to accurately measure the quality of an analog signal transmitted over a radio link is important when the analog signal is transmitted as a non-real-time signal in a system having a protocol allowing acknowledgment of the analog signal, such as a paging system sending voice messages that can be acknowledged or which, when not acknowledged, can be retransmitted. In such a system, the average quality of analog messages delivered to radio receivers can be improved. Another example in which being able to accurately measure the quality of an analog signal transmitted over a radio link is important is when the analog signal is a voice signal which is transduced on a real-time basis and transmitted in an radio environment which includes high levels of interference. In such a system, a high accuracy quality signal can provide a better squelch function.

Thus, what is needed is an improved technique for accurately measuring the quality of an analog signal in radio communication system.

SUMMARY OF THE INVENTION

Accordingly, in a first aspect of the present invention, a fixed site is used in a radio communication system. The fixed site is for generating an outbound radio signal which includes periodic synchronous cycles. The cycle includes an analog portion within which a signal quality level of a first information signal is determined by a selective call radio. The fixed site includes a system controller and a radio transmitter. The system controller includes an analog information means which generates the first information signal; a quality signal means which generates a quality assessment signal; a message handler, and a cell site controller. The message handler is coupled to the analog information means and the quality signal means. The message handler determines a selective call radio address of the selective call radio and assembles cycle information including the selective call radio address, the first information signal, and the quality assessment signal. The cell site controller is coupled to said message handler and sends the cycle information to a transmitter over a communication link. The radio transmitter is coupled to the cell site controller and includes a transmitter controller which receives the cycle information; a frequency modulator which transmits a control frame generated by frequency modulating a radio carrier with the selective call radio address; and an amplitude modulator which transmits an analog portion of an analog frame. The analog portion is generated by amplitude modulating the radio carrier with the first information signal and the quality assessment signal.

Accordingly, in a second aspect of the present invention, a selective call radio is for use in a radio communication system. The radio communication system transmits an outbound radio signal which includes periodic synchronous cycles. The selective call radio includes a receiver front end, a frequency modulation (FM) demodulator, an amplitude modulation (AM) demodulator, a digital control section, an analog section, and an alert device. The receiver front end receives and converts a cycle of the radio signal. The cycle has a digital portion and an analog portion which are, respectively, frequency modulated by a digital signal and amplitude modulated by an analog signal. The analog signal includes a quality assessment signal and an information signal. The digital signal includes a message address. The FM demodulator is coupled to the receiver front end and demodulates the converted signal to recover the digital signal. The AM demodulator is coupled to the receiver front end and demodulates the converted signal to recover the analog signal. The digital control section is coupled to the FM demodulator. The digital control section decodes the message address, generates a message received signal when the message address matches a selective call address stored in the selective call radio within predetermined limits, and generates a quality signal indication while the quality assessment signal is being received. The analog section is coupled to the digital control section and the AM demodulator. The analog section processes the analog signal in response to the message received signal, records at least one measurement of the quality assessment signal during the quality signal indication, and determines a signal quality level of the information signal from the at least one measurement of the quality assessment signal. The alert device is coupled to the digital control section and generates a sensible alert in response to the signal quality level.

Accordingly, in a third aspect of the present invention a method is used in a radio communication system for determining a signal quality level of an analog signal received by a selective call radio within an analog portion of a cycle of an outbound radio signal. The radio communication system transmits periodic synchronous cycles in the outbound radio signal. The method includes, within a system controller, the steps of generating a digital signal which includes a message address of the selective call radio; generating an analog signal which includes a quality assessment signal and an information signal; and coupling the digital and analog signals to a transmitter. The method further includes, within a radio transmitter, the step of transmitting a cycle including a digital portion generated by frequency modulating a radio carrier with the digital signal and an analog portion generated by amplitude modulating a radio carrier with the analog signal. The method further includes, within the selective call radio, the steps of: receiving the digital and analog portions; frequency demodulating the digital signal; amplitude demodulating the analog signal; decoding the message address; generating a message received signal when the message address matches a selective call address stored in the selective call radio within predetermined limits; generating a quality signal indication while the quality assessment signal is being received; processing the first information signal in response to the message received signal; recording at least one measurement of the quality assessment signal during the quality signal indication; determining the signal quality level of the information signal from the at least one measurement of the quality assessment signal; and generating a sensible alert in response to the signal quality level.

Accordingly, in a fourth aspect of the present invention, a method is used in a selective call radio. The selective call radio is for use in a radio communication system which transmits periodic synchronous cycles in an outbound radio signal. The method includes the steps of: receiving a radio signal; frequency demodulating a digital signal; amplitude demodulating an analog signal; decoding a message address; generating a message received signal when the message address matches a selective call address stored in the selective call radio within predetermined limits; generating a quality signal indication while the quality assessment signal is being received; processing the information signal in response to the message received signal; recording at least one measurement of the quality assessment signal during the quality signal indication; determining a signal quality level of the information signal from the at least one measurement of the quality assessment signal; and generating a sensible alert in response to the signal quality level. In the step of receiving the radio signal, the radio signal includes a cycle, wherein the cycle has the digital portion and the analog portion sequentially transmitted which are, respectively, frequency modulated by the digital signal and amplitude modulated by the analog signal, and wherein the analog signal includes the quality assessment signal and the information signal, and wherein the digital signal includes the message address.

DETAILED DESCRIPTION OF A PREFERRED EMBODIMENT

Described herein below is a method and apparatus for determining a quality level indication for an analog signal which is included in a radio signal and received at a selective call radio. Briefly, the radio signal includes a frame having both a header portion and an analog portion, and the analog portion includes at least one analog signal and an analog quality assessment signal. The selective call radio derives a signal quality level from the quality assessment signal. When the signal quality level indicates that a good analog signal has been received, the analog signal is further processed, such as generating an audio signal for driving a speaker, and an acknowledgment is generated. In the preferred embodiment of the present invention, the analog portion of the frame is transmitted by double side band (DSB) modulation, wherein each of two sidebands of the DSB modulation is modulated by an independent analog signal, using a Hilbert transform. The analog quality assessment signal is included in one of the sidebands but is used for determining the quality of analog information signals transmitted in each of the two sidebands during the same frame. An alternative includes quality assessment signals in both sidebands, which is simpler to implement, but is less efficient in terms of message throughput.

Figure 1:
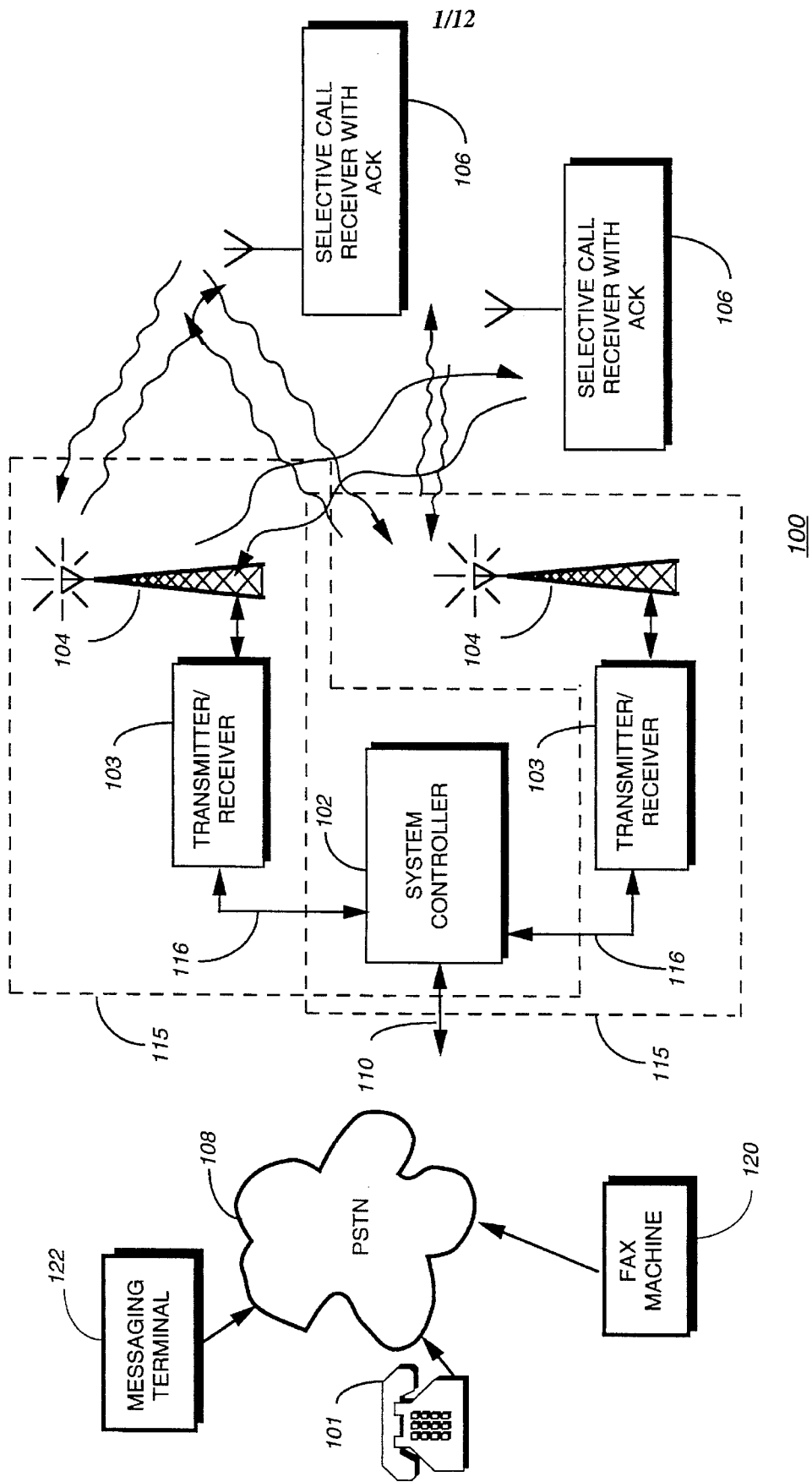
FIG. 1 is an electrical block diagram of a radio communication system, in accordance with the preferred embodiment of the present invention.

Referring to FIG. 1, an electrical block diagram of a radio communication system 100 is shown in accordance with the preferred embodiment of the present invention. The radio communication system 100 comprises a message input device, such as a conventional telephone 101, a facsimile machine 120 or a messaging terminal 122, connected through a conventional switched telephone network (STN) 108 by conventional telephone links 110 to a system controller 102. The system controller 102 oversees the operation of a plurality of radio frequency transmitter/receivers 103, through one or more communication links 116, which typically are twisted pair telephone wires, and additionally can include RF, microwave, or other high quality audio communication links. The system controller 102 encodes and decodes inbound and outbound telephone addresses into formats that are compatible with land line message switch computers. The system controller 102 also functions to encode and schedule outbound messages, which can include such information as analog voice messages, digital numeric messages, and response commands, for transmission by the radio frequency transmitter/receivers 103 to a plurality of selective call radios 106. The system controller 102 further functions to decode inbound messages, including unsolicited and response messages, received by the radio frequency transmitter/receivers 103 from the plurality of selective call radios 106.

Examples of response messages are acknowledgments and designated response messages. An acknowledgment is a response to an outbound message initiated at the system controller 102. An example of an outbound numeric message intended for a selective call radio 106 is an numeric page message entered from the telephone 101. An example of an outbound analog message intended for a selective call radio 106 is a voice page message entered from the telephone 101. For these examples, the acknowledgment indicates successful reception of the outbound numeric or analog message. A designated response message is a message sent from a selective call radio in response to a command included in an outbound message from the system controller 102. An example of a designated response message is a message initiated by the selective call radio 106, but which is not transmitted until after a designated response command is received from the system controller 102. The designated response command, in turn, is sent by the system controller 102 after an inbound message requesting permission to transmit the designated response message is communicated from the selective call radio 106 to the system controller 102. The response messages are preferably transmitted at a time designated within the outbound message or command, but alternatively can be transmitted using a non-scheduled protocol, such as the ALOHA or slotted ALOHA protocol, which are well known to one of ordinary skill in the art. An unsolicited message is an inbound message transmitted by a selective call radio 106 without having received an outbound message which requires a response. An example of an unsolicited message is an inbound message from a selective call radio 106 which alerts the radio communication system 100 that the selective call radio 106 is within radio range of the radio communication system 100. An unsolicited message can include a request to transmit a designated response and can include data such as numeric data. Unsolicited messages are transmitted using an ALOHA or slotted ALOHA protocol. The inbound and outbound messages are included in outbound radio signals transmitted from, and inbound radio signals received by, a conventional antenna 104 coupled to the radio frequency transmitter/receiver 103. The radio communication system 100 is further characterized as comprising a plurality of fixed sites 115, each fixed site comprising the system controller 102, one of the radio frequency transmitter/receivers 103, the communication link 116 coupling the system controller 102 to the radio frequency transmitter/receiver 103, and the antenna 104.

It should be noted that the system controller 102 is capable of operating in a distributed transmission control environment that allows mixing conventional cellular, simulcast, satellite, or other coverage schemes involving a plurality of radio frequency transmitter/receivers 103, conventional antennas 104, for providing reliable radio signals within a geographic area as large as a worldwide network.

Each of the selective call radios 106 assigned for use in the radio communication system 100 has at least one address assigned thereto which is a unique selective call address. The selective call address enables the transmission of a message from the system controller 102 only to the addressed selective call radio 106.

Figure 2:
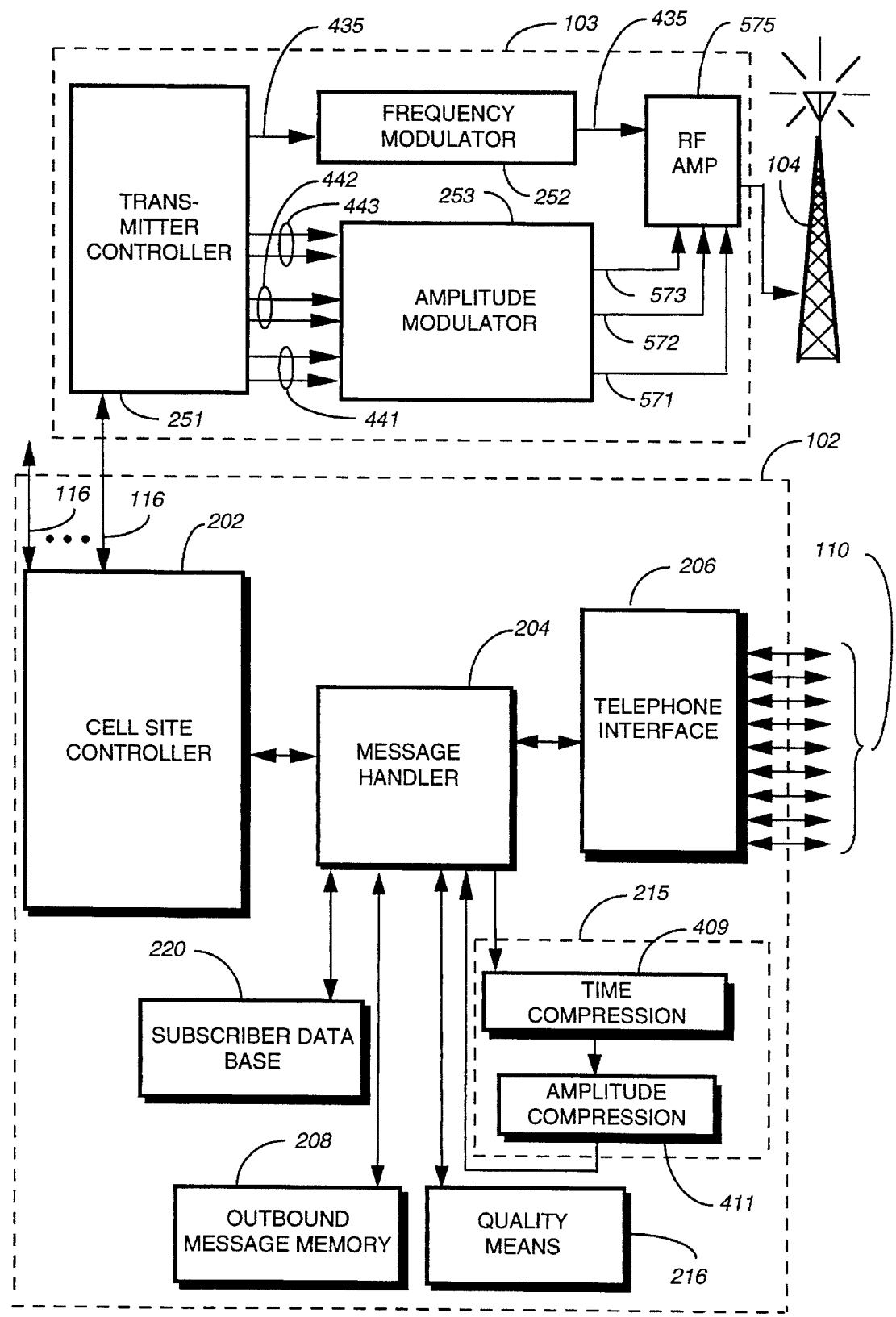
FIG. 2 is an electrical block diagram of a fixed site of the radio communication system, in accordance with the preferred embodiment of the present invention.

Referring to FIG. 2, an electrical block diagram of a fixed site 115 is shown, in accordance with the preferred embodiment of the present invention. The fixed site 115 comprises the system controller 102, the radio transmitter/receiver 103, the communication link 116 coupling the system controller 102 to, the radio transmitter/receiver 103, and the antenna 104. The system controller comprises a cell site controller 202, a message handler 204, a subscriber data base 220, an outbound message memory 208, a telephone interface 206, compression means 215, and quality means 216. The cell site controller 202 is coupled to the radio frequency transmitter/receivers 103 (FIG. 1) by the links 116. The cell site controller 202 couples selective call addresses and outbound messages to the transmitter/receivers 103 and controls the transmitter/receivers 103 to transmit transmission cycles which include the selective call addresses and outbound messages. The cell site controller 202 also processes inbound messages from the selective call radios 106. The inbound messages are received by the transmitter/receivers 103 and coupled to the cell site controller 202. The message handler 204, which routes and processes messages, is coupled to the telephone interface 206, the subscriber data base 220, the compression means 215 and the quality means 216.

The telephone interface 206 handles the switched telephone network 108 (STN) (FIG. 1) physical connection, connecting and disconnecting telephone calls at the telephone links 110, and routing the audio signals between the telephone links 110 and the message handler 204. The subscriber data base 220 stores information for each subscriber, including a correlation between a selective call address assigned to each selective call radio 106 and the telephone number used within the STN 108 to route messages and telephone calls to each selective call radio 106, as well as other subscriber determined preferences, such as hours during which messages are to be held back from delivery to the selective call radio 106. The outbound message memory 208 is for storing a queue of numeric or analog messages which are queued for delivery to at least one of the plurality of selective call radios 106, wherein each message of the queue of messages is associated with a selective call address, also stored in the outbound message memory 208, of one of the plurality of selective call radios 106 for which each message is intended. Analog messages are converted to digital form by the message handler 204, prior to being stored in the message memory 208.

The message handler 204 schedules outbound messages and the selective call addresses associated therewith for transmission within a transmission cycle, by scheduling, as necessary, portions of messages within frames of a transmission cycle. As described above, messages may have either digital information, such as a numeric message, or analog information, such as voice. A digital portion of a cycle which, in accordance with the preferred embodiment of the present invention is one or more control frames, is prepared for transmission by the message handler 204, which determined from the subscriber data base 220 the selective call addresses of selective call radios associated with both numeric and analog messages which are included in the cycle. The message handler 204 prepares analog signals for inclusion in the cycle by first converting the analog signals to digitized analog signals in a conventional analog to digital conversion manner. The compression means 215, which is coupled to the message handler 204, generates compressed analog message fragments, preferably using digital signal processing techniques. In accordance with the preferred embodiment of the present invention, the compressed analog fragments are included in analog frames as analog signals. When the analog information is one or more voice signals, the frame is also called a voice frame.

The compression means 215 comprises a time compression element 409 which is coupled to the message handler 204 and a amplitude compression and filtering element 411 which is coupled to the time compression element 409 and to the message handler 204. The amplitude compression and filtering element 411 and the time compression element 409 are described in detail below, with reference to FIG. 4. Each analog frame includes up to six analog signals which are transmitted simultaneously and which have a duration of an analog portion of an analog frame. The quality means 216 stores a predetermined analog quality assessment signal which is included a predetermined number of times in each analog portion of a frame having an analog portion. The predetermined analog quality assessment signal in accordance with the preferred embodiment of the present invention is a DC level at some percentage of a peak AC level. The result of this type of quality assessment signal is an unmodulated carrier. Other types of quality assessment signals, such as a single or multiple tone waveform, can alternatively be used as well. A unique alternative quality assessment signal can be a segment of the analog information itself. For example, when the analog information signal is a voice message, then silence segments which occur naturally within the voice message can be identified and used as quality assessment signals. The results of a silence segment in the voice message is an unmodified carrier, which is the same signal which results from inserting the DC level (or artificial silence) as described. Using the silence segments can also improve information throughput. The location of naturally occurring silence segments within a frame can be indicated to the selective call radio 106 within the digital information header part of the analog frame, or within the control frame. The message handler 204 assembles digital and digitized compressed analog information for one cycle, which includes the one or more control frames and one or more analog frames. In each analog frame analog signals are assembled into pairs having a first and a second analog signal. Message fragments for any one selective call radio 106 are included in one or both signals of at most any one pair. The quality assessment signal is included in the first analog signal of each pair. After assembly, the cycle information is digitally coupled from the message handler 204 to the cell site controller 202, where it is digitally coupled to one or more of the radio frequency transmitter/receivers 103. The transmitter/receiver 103 converts the digitized compressed analog information into compressed analog information for transmission to the selective call radio 106.

The message handler 204 also identifies inbound messages as being associated with one of the selective call radios in the subscriber data base 220 and identifies response messages as being associated with one of the outbound messages in the outbound message memory 208. As one example of an operation of the system controller 102, the delivery of an outbound message which has been received from an originator and stored in the outbound message memory 208 is completed when the outbound message has been communicated to the intended selective call radio 106, a message response is communicated back to the system controller 102 from the selective call radio 106, and the message response is identified as being a response message generated specifically for the outbound message. In this example, the response is an acknowledgment and the message handler 204 removes the outbound message from outbound message memory 208.

In an alternative embodiment, voice messages are not compressed. When a voice message requires multiple frames for complete transmission, the segments from all frames are received and reassembled prior to presenting the message to a user.

System controller 102 is preferably a model MPS2000® paging terminal manufactured by Motorola, Inc., of Schaumburg Ill., modified with special firmware elements in accordance with the preferred embodiment of the present invention, as described herein. The cell site controller 202, the message handler 204, the telephone interface 206, the outbound message memory 208, the subscriber data base 220, the compression means 215, and the quality means 216 are preferably implemented within portions of the model MPS2000® paging terminal which include, but are not limited to those portions providing program memory, a central processing unit, input/output peripherals, analog to digital and digital to analog signal conversion circuitry, and a random access memory. The system controller alternatively could be implemented using a model E09PED0552 PageBridge® paging terminal manufactured by Motorola, Incorporated of Schaumburg, Ill. The subscriber data base 220 and the outbound message memory 208 can alternatively be implemented as magnetic or optical disk memory, which can alternatively be external to the system controller 102.

The radio frequency transmitter/receiver 103 comprises a transmitter controller 251, a frequency modulator 252, an amplitude modulator 253, and a radio frequency amplifier 455. The transmitter controller 251 is coupled to the cell site controller 202 of the system controller 102 by the communication link 116, and is also coupled to the frequency modulator 252 and the amplitude modulator 253. The transmitter controller 251 receives the frame information and couples the digital information portion 435 of the analog frame 430 to the frequency modulator 252 for modulating a radio carrier at a frequency $F_B$, for example 940.000 MHz, generating a first low level RF signal 435 which is a header portion of a frame. The first low level RF signal 435 is coupled to the RF amplifier 455 and amplified, generating a first output signal having a power level, for example of 250 watts, and coupled to the antenna 104 and transmitted. The transmitter controller 251 then generates three pairs of analog information signals 441, 442, 443 by converting the digitized analog information signals into analog signals and couples them to the amplitude modulator 253 simultaneously, which responds by generating a set of second low level RF signals 571, 572, 573, which is an analog portion of the frame. The second set of level RF signals 571, 572, 573 are coupled simultaneously to the RF amplifier 455. The RF amplifier amplifies the low level RF signals 571, 572, 573, generating a second output signal having a power level which is not necessarily the same as the power level of the first output signal, and couples the second output signal to the antenna 104 for transmission to the selective call radio 106. The three pairs of analog information signals fill a 25 KHz radio communication channel centered at frequency $F_B$, which is the carrier frequency during FM transmission of the digital portion of the signal. Other channel configurations are also possible as described below.

The transmitter controller 251 is a controller module comprising conventional controller hardware, including a microprocessor, and having unique firmware elements for controlling the digital and analog information flow to the modulators 252 and 253 as described herein. The amplitude modulator 253 and RF amplifier 455 are described more fully below. The frequency modulator 252 is a conventional frequency modulator. The primary radio carrier frequency in the preferred embodiment of the present invention is in the 900 MHz band, but other radio carrier frequencies in other bands can be equally used.

Figure 3:
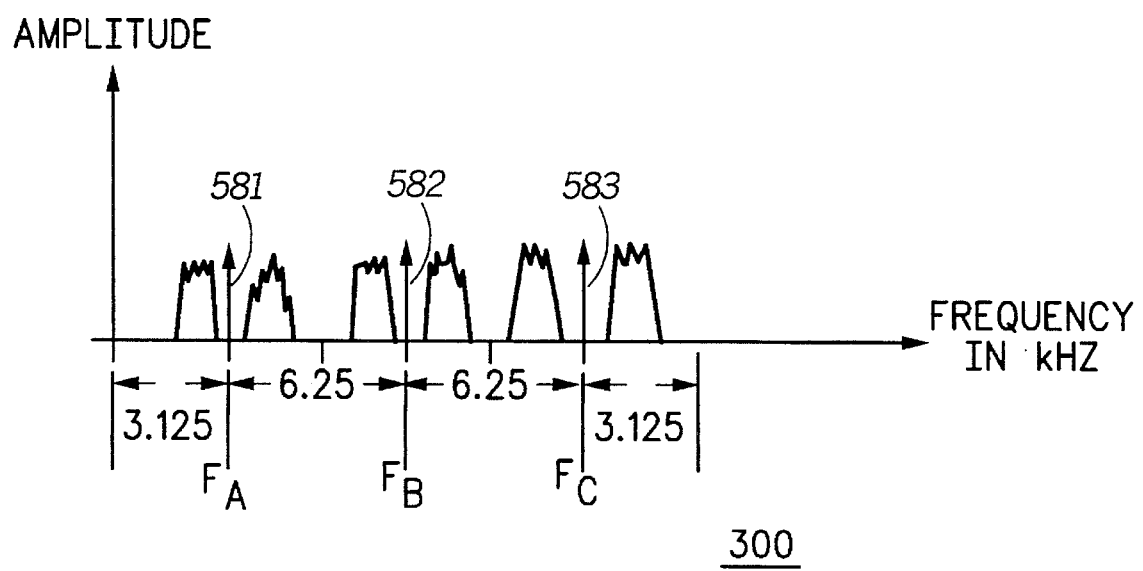
FIG. 3 is a spectral diagram of RF signals transmitted by the fixed site, in accordance with the preferred embodiment of the present invention.

Referring to FIG. 3, a spectral diagram 300 of the second output signal transmitted by a fixed site 115 is shown, in accordance with the preferred embodiment of the present invention. The compressed voice radio signal is highly bandwidth efficient and the radio communication system 100 is intended to support typically 6 to 30 voice messages per 25 KHz channel using the basic concepts of quadrature amplitude (QAM) or single-side band (SSB) modulation and time scaling of speech signals. The second high level signal, which is transmitted within a compressed voice channel or voice communication resource, consists of 3 sub-channels having pilot carriers 581, 582, 583 at sub-carrier frequencies $F_A$, $F_B$, and $F_C$ that are separated by 6.250 KHz. Each sub-channel consists of two side-bands and one of the pilot carriers 581, 582, 583 between the sidebands. Each of the two side-bands associated with one of the pilot carriers 581, 582, 583 has portions of different speech messages or two portions of a single message split between the upper and lower sidebands in accordance with the preferred embodiment of the present invention. In accordance with a first alternative embodiment, the two side bands carry the same information. Each single sub-channel has a bandwidth of approximately 6.250 KHz with each side-band being approximately 3.125 KHz. The actual compressed speech occupied bandwidth is approximately 300–2800 Hz. In accordance with a second alternative embodiment of the present invention, each sub-channel is modulated with the in-phase (I) and quadrature (Q) signals which each occupy the 6250 Hz sub-channel bandwidth, but where the I and Q signals respectively contain portions of both of the two signals.

In the examples shown herein, an incoming speech message is received by the system controller 102, preferably encoded using Pulse Coded Modulation (PCM). The speech is converted to linear PCM before any further processing is done. In accordance with the preferred embodiment of the present invention, the radio communication system 100 preferably uses a time-scaling technique to achieve the required time compression. The preferred compression technique used in the present invention requires certain parameters specific to the incoming message to provide an optimum quality. Preferably, the compression technique used in the time compression element 409 time-scale compresses the processed speech signal into a signal having the same bandwidth characteristics as uncompressed speech. (Once these parameters are computed, speech is compressed using the desired time-scaling compression technique). This time-scaled compressed speech is then amplitude compressed by the amplitude element 411 (preferably using a syllabic compander) by the amplitude compression element 411. The resulting compressed analog signal is encoded using an adaptive differential PCM technique to reduce the number of bits required to be distributed to the transmitters. Amplitude compression of the incoming speech signals (preferably using a syllabic compander) is used in the system controller 102 to give protection against RF channel impairments after transmission by the transmitter/receiver 103.

A time scaling technique known as Waveform Similarity based Overlap-Add technique or WSOLA encodes the speech message into an analog signal having the same bandwidth characteristics as uncompressed speech. This property of WSOLA allows it to be combined with SSB or QAM modulation such that the overall compression achieved is the product of the bandwidth compression ratio of multiple QAM or SSB sub-channels (in our example, 6 voice signals) and the time compression ratio of WSOLA (typically between 1 and 5).

The adaptive pulse code modulated (ADPCM) signal is decoded at the transmitter/receiver 103, to obtain an amplitude companded WSOLA compressed speech signal. This signal is processed using a Hilbert transform method and quadrature modulated to obtain a single-sideband signal. This process is typically replicated in the system controller 102 and transmitter/receiver 103 for a plurality of signals, up to six in the example used herein. A pilot carrier is digitally added to each sub-channel signal and the final signal is interpolated, preferably, to a 16 KHz sampling rate and converted to analog. This is then modulated with the sub carrier frequency and transmitted. Alternatively, the signal is quadrature modulated to obtain a QAM signal, instead of first being Hilbert transformed.

The radio communication system 100 can operate as a mixed-mode (voice or digital) one or two way communications system for delivering analog voice and/or digital messages to selective call radios 106 on a forward channel (outbound from the transmitter/receiver 103) and for receiving acknowledgments from the same selective call radios 106 which additionally have optional transmitters on an optional reverse channel (inbound to the transmitter/receiver 103). The radio communication system 100 of the present invention preferably utilizes a synchronous frame structure similar to FLEX™ (a high speed paging protocol by Motorola, Inc. of Schaumburg, Ill.) on the forward channel for both addressing and voice messaging. As described above, two types of frames are used: control frames and voice frames. The control frames are preferably used for addressing and delivery of digital data to selective call radios 106. The voice frames are used for delivering analog voice messages to the selective call radios 106. Both types of frames are identical in length to standard FLEX™ frame and both frames begin with the standard FLEX™ synchronization. These two types of frames are time multiplexed on a single forward channel. The frame structure for the present invention will be discussed in greater detail later on with reference to FIGS. 7, 8, and 9.

With regard to modulation, two types of modulation are preferably used on the forward channel of the present invention: Digital FM (2-level and 4-level frequency shift keying) and AM (SSB or QAM with pilot carrier). Digital FM modulation is used for the digital frame and a header of analog frames. AM is used in an analog portion (voice message portion) of the analog frames (each sideband is preferably used independently). The digital FM portions of the transmission support 6400 bits per second (bps) (3200 Baud symbols) signaling. The AM portions of the transmissions support band limited voice (2800 Hz) and require 6.25 KHz for a pair of voice signals. The protocol, as will be shown later, takes advantage of the reduced AM bandwidth by subdividing a full channel into 6.25 KHz sub-channels, and by using each sub-channel and the AM sidebands for independent messages.

The radio communication system 100 in accordance with the preferred embodiment of the present invention of the present invention is preferably designed to operate on either 25 KHz or 50 KHz forward channels, but other channel bandwidths are certainly within contemplation of the present invention. A 25 KHz forward channel supports a single FM control signal during control frames, and up to 3 AM sub-channels (6 independent sidebands) during the analog portion of voice frames. A 50 KHz forward channel supports two FM control signals operated in time lock during control frames, and up to 7 AM sub-channels (14 independent sidebands) during the analog portion of voice frames. Of course, other configurations using different size bandwidths and numbers of sub-channels and sidebands are contemplated within the present invention. The examples disclosed herein are merely illustrative and are meant to be indicative of the potential broad scope of the claims herein.

In addition to the spectrum efficiency achieved through modulation and sub-channeling of the spectrum, the preferred embodiment of the present invention utilizes a speaker dependent voice compression technique that time scales the speech by a factor of 1 to 5 times. By using both AM sidebands of a sub-channel for different portions of the same message or different messages, the overall compression factor per sub-channel is 2 to 10 times. Voice quality will typically decrease with an increasing time compression factor. The compression technique used in the voice system of the preferred embodiment of the present invention is a known time-scaling technique known as Waveform Similarity based Overlap-Add technique (WSOLA), or any similar technique which achieves similar time compression of a voice message.

In accordance with the preferred embodiment of the present invention, a reverse channel is used for acknowledgments and responses which are communicated from the selective call radio 106 to the system controller 102. A frequency division simplex mode of operation is supported. In the frequency division simplex mode of operation, a separate dedicated channel is provided for inbound transmissions. The radio communication system 100 is preferably operated in a targeted message mode whereby the outbound messages are broadcast only on a single transmitter/receiver 103, or a small set of transmitter/receivers 103, located near the selective call radio 106. The targeted message mode is characterized by simulcast addressing from a plurality of radio transmitter/receivers 103 for locating the selective call radio 106, a selective call radio's responding on the reverse channel, which provides a location, followed by a localized message transmission to the selective call radio 106. The targeted message mode of operation is advantageous in that it provides the opportunity for sub-channel reuse; and consequently, this mode of operation can lead to increased system capacity in many large radio communication systems.

A reverse channel can be managed in alternative ways, for example, time division multiplexing. When no reverse channel is available, the radio communication system 100 can alternatively be operated in simulcast mode for both addressing and voice messaging.

It will be appreciated that there are alternative techniques for partitioning some of the functions described herein between the system controller 102 and the radio frequency transmitter/receiver 103 which will perform equally well. For example, analog message information for messages intended for one or more selective call radios 106 could be sent to the radio frequency transmitter/receiver 103 wherein it is compressed and partitioned for inclusion in one or more frames, instead of compressing and partitioning it in the system controller 102, or the signal could be time compressed in the system controller 102 and amplitude compressed in the transmitter/receiver 103.

Figure 4:
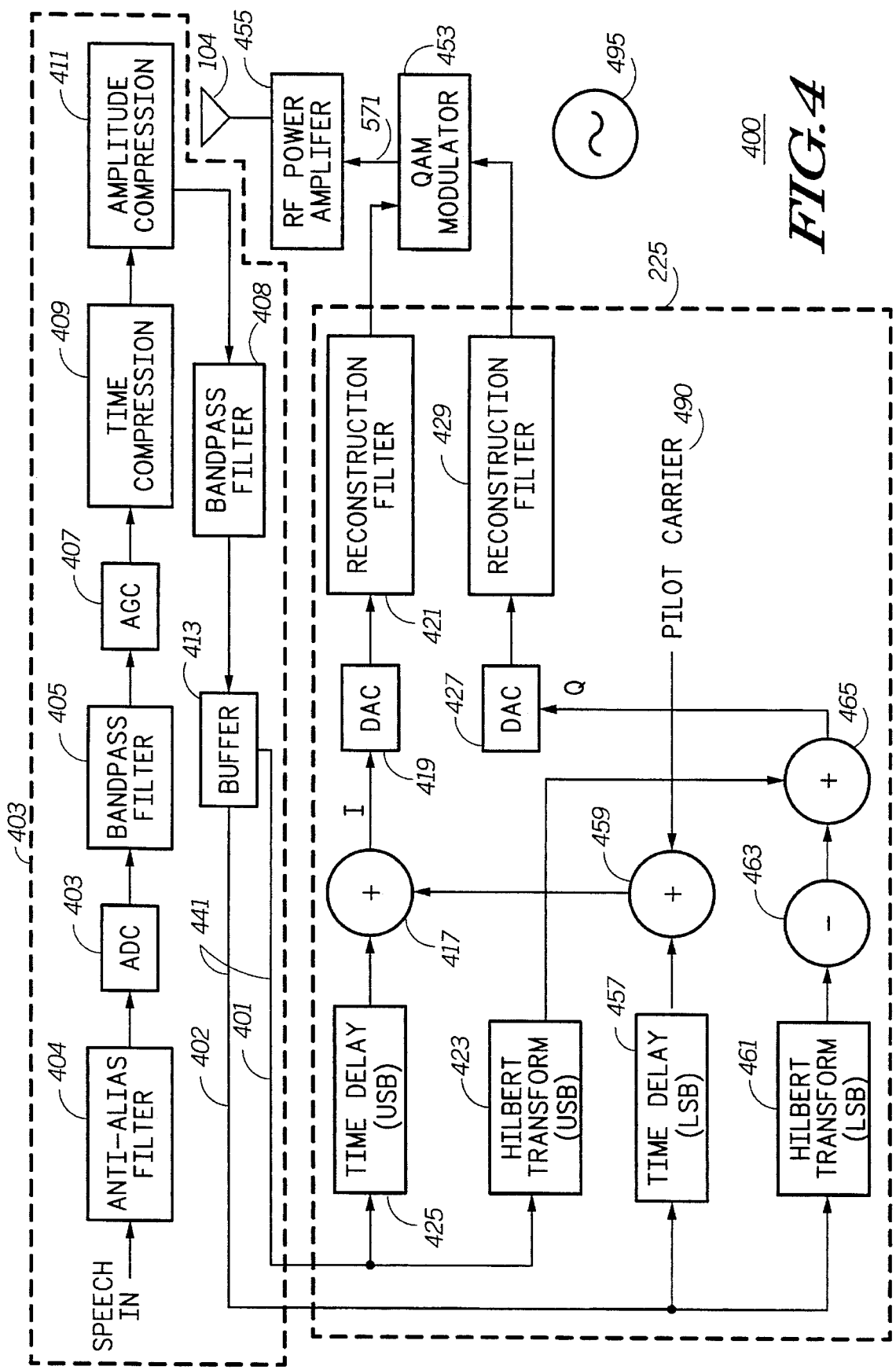
FIG. 4 is an electrical block diagram of portions of the fixed site, in accordance with the preferred embodiment of the present invention.

Referring to FIG. 4, an electrical block diagram of portions of the fixed system 115 are shown, in accordance with the preferred embodiment of the present invention. In the system controller 102, an analog speech signal is input to an anti-aliasing low pass filter 404 which strongly attenuates all frequencies above one-half the sampling rate of an analog-to-digital converter (ADC) 403 which is coupled to the filter 404. The ADC 403 preferably converts the analog speech signal to a digital signal so that further signal processing can be done using digital processing techniques. Digital processing is the preferred method, but the same functions could also be performed with analog techniques or a combination of analog and digital techniques.

A band pass filter 405 coupled to the ADC 403 strongly attenuates frequencies below and above the cutoff frequencies of the bandpass filter 405. The lower cutoff frequency is preferably 300 Hz which allows the significant speech frequencies to pass, but attenuates lower frequencies which would interfere with a pilot carrier. The upper cutoff frequency is preferably 2800 Hz which allows the significant speech frequencies to pass but attenuates higher frequencies which would interfere with adjacent transmission sub-channels or channels. An automatic gain control (AGC) element 407 preferably coupled to the filter 405 equalizes the volume level of different speakers' voices.

The time compression element 409, which is preferably coupled to the AGC element 407 shortens the time required for transmission of the speech signal while maintaining essentially the same signal spectrum as at the output of the bandpass filter 405. The time compression method is preferably equivalent to a WSOLA type of compression, which is well known to one of ordinary skill in the art. An amplitude compression element 411, which is coupled to the time compression element 409, and the corresponding amplitude expansion element 770 in a selective call radio 106 (FIGS. 9 and 10), form a companding device which increases the apparent signal-to-noise ratio of the received speech, in a manner well known to one of ordinary skill in the art. The companding ratio is preferably 2 to 1 in decibels, but other ratios could be used in accordance with the present invention. A second band pass filter 408 coupled to the amplitude compression element 411 strongly attenuates frequencies below and above its cutoff frequencies to remove any spurious frequency components generated by the AGC 407, the time compression element 409 or the amplitude compression element 411. The lower cutoff frequency is preferably 300 Hz which allows the significant speech frequencies to pass, but attenuates lower frequencies which would interfere with the pilot carrier. The upper cutoff frequency is preferably 2800 Hz which allows the significant speech frequencies to pass but attenuates higher frequencies which would interfere with adjacent transmission channels. The time compressed speech samples are stored in a buffer 413 until an entire speech message has been processed. This allows the time compressed speech message to be processed for transmission as a whole. This buffering method is preferred used for a paging service, which is typically a non real time service. Other buffering methods may be preferable for other applications. For example, for an application involving two-way real time conversation, the delay caused by this type of buffering could be intolerable. In that case it would be preferable to interleave small segments of several conversations. For example, if the time compression ratio is 3:1, then 3 real time speech signals could be transmitted via a single channel. The 3 transmissions could be interleaved on the channel in 150 millisecond bursts and the resulting delays would not be objectionable.

In the particular instance of the radio communication system 100 illustrated in FIGS. 1 and 2, such as a paging system, the devices 403–413 are a portion of the system controller 102 and the remaining components in FIG. 4, except the antenna 104, form a portion of the transmitter/receiver 103. In an alternative approach, the devices 403–409 are a portion of the system controller 102 and the remaining components in FIG. 4, except the antenna 104, form a portion of the transmitter/receiver 103. There is typically a digital communication link 116 between the system controller 102 and the transmitter/receiver 103. In the latter instance, the signal after time compression element 409 is encoded by the system controller 102 preferably using a pulse code modulation (PCM) technique and then subsequently decoded using PCM at the transmitter/receiver 103 to reduce the number of bits transferred between the system controller 102 and at the transmitter/receiver 103.

Referring again to FIG. 4, the time compressed speech samples stored in the buffer 413 are divided to be transmitted on either the upper or lower sideband. Preferably, a first portion of the time compressed speech message 401 having a duration less than or equivalent to somewhat less than one frame duration is transmitted via one sideband and a second portion of the time compressed speech message 402 having a duration less than or equivalent to somewhat less than one frame duration is transmitted via the other sideband. Thus, both the upper and lower sidebands are used to simultaneously transmit different portions of the same time compressed voice message. If a compressed speech message requires more than an upper and lower sideband of one sub-channel, additional portions are transmitted in a subsequent analog frame.

The first portion of time compressed speech samples 401 from the buffer 413 is applied to both a first Hilbert transform filter 423 and to a first time delay element 425 which has the same delay as the Hilbert transform filter 423 but does not otherwise affect the signal. The output of the first time delay (through summing element 417) and the first Hilbert transform filter 423 (through summing element 465) are In-Phase (I) and Quadrature Phase (Q) signal components which, when coupled to I and Q inputs of the QAM modulator, generate an upper sideband signal having information only from the first portion of time compressed speech samples. The second portion of time compressed speech samples 402 from the buffer 413 is applied to both a second Hilbert transform filter 461 and to a second time delay element 457 which has the same delay as the Hilbert transform filter 461 but does not otherwise affect the signal. The output of the second time delay (through summing elements 459 and 417) and the negative (463) of the output of the second Hilbert transform filter 461 (and again, through summing element 465) are In-Phase (I) and Quadrature Phase (Q) signal components which, when coupled to I and Q inputs of the QAM modulator, generate an upper sideband signal having information only from the second portion of time compressed speech samples.

The I components of the upper and lower sideband signals are added with a DC pilot carrier component 490 (through summing element 459) to form a composite I component for transmission. The Q components of the upper and lower sideband signals are added (through summing element 465) to form a composite Q component for transmission. The pilot carrier 581 which is generated in the second output signal by the DC pilot carrier component is transmitted along with the second output signal and used by the selective call radio 106 to substantially cancel the effects of gain and phase variations or fading in the transmission channel. It will be appreciated that the elements 425, 423, 457, 461, 417, 459, 463, 465, 419, 427, 421, and 429 form a preprocessor 255 which generates preprocessed I and Q signal components, which when coupled to the QAM modulator 453 generate the low level sub-channel signal with a sub carrier of $F_A$, having two single sideband signals, which have information from different analog sources in each sideband.

The I and Q components of the signal are converted to analog form by digital-to-analog converters (DAC) 419 and 427 respectively. The two components are then filtered by low pass reconstruction filters 421 and 429 respectively to remove spurious frequency components resulting from the digital-to-analog conversion process. An RF oscillator 495 generates a reference signal at the sub-carrier frequency, $F_A$. The reference signal, $F_A$, and the output signals of the low pass reconstruction filters 421, 429 are coupled to a quadrature amplitude modulation (QAM) modulator 453 which modulates the I and Q components onto the radio frequency sub-carrier, at low power level. Other modulation methods, e.g. direct digital synthesis of the modulated signal would accomplish the same purpose as the DACs (419 and 427), reconstruction filters (421 and 429), and QAM modulator 453. The RF power amplifier 455 amplifies the modulated RF signal to the desired power level. The output of the RF power amplifier 455 is coupled to the transmitting antenna 104. Other variations can produce essentially the same results. For example, the amplitude compression could be performed before the time compression, or omitted altogether and the device would still perform essentially the same function.

While the upper sideband 401 is used to transmit one time compressed speech signal, the lower sideband 402 can alternatively be used to simultaneously transmit a second time compressed speech signal. SSB is the preferred modulation method because of efficient use of transmission bandwidth and resistance to crosstalk. Double sideband amplitude modulation (AM) or frequency modulation (FM) can also be used alternatively, but would require at least twice the bandwidth for transmission. It is also possible to transmit one time compressed speech signal directly via the I component and a second time compressed speech signal directly via the Q component, but this method is subject to crosstalk between the two signals when multipath reception occurs at the selective call radio 106. When any of these modulation techniques are used, the present invention provides benefits of improved signal quality measurement, which are further described below.

Preferably, only the anti-alias filters 404, the reconstruction filters 421, 429, the RF power amplifier 455, and optionally the Analog to Digital converter 403 and digital to analog converters 419, 427 are separate conventional hardware components. The remainder of the devices described with reference to FIG. 4 are preferably be incorporated into unique firmware elements which are run on one or more processors, preferably digital signal processors. The processors preferably provide processing of other conventional elements of the system controller 102 and transmitter/receiver 103 described herein.

Figure 5:
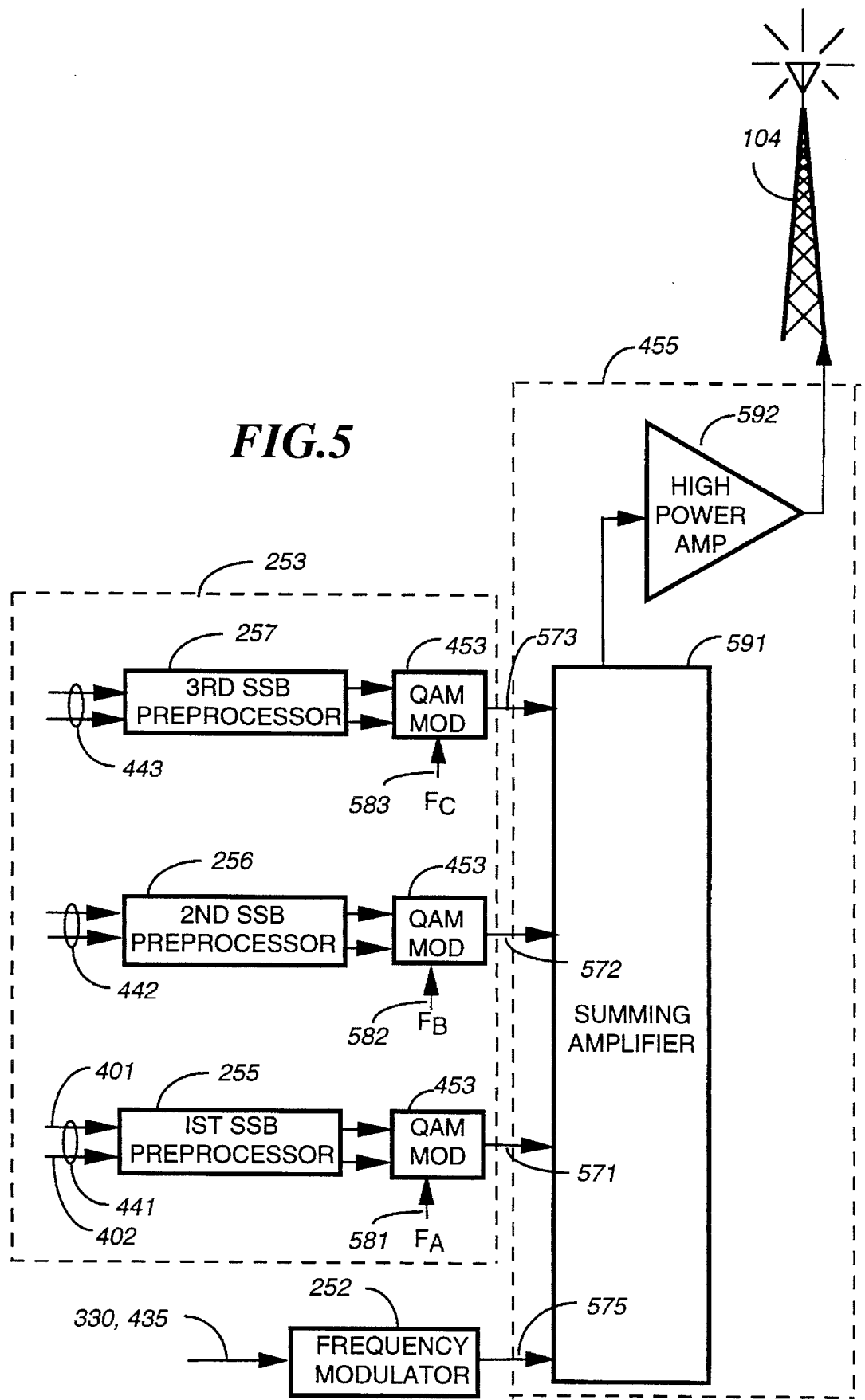
FIG. 5 is an electrical block diagram of an amplitude modulator and an RF amplifier used in the fixed site, in accordance with the preferred embodiment of the present invention.

Referring to FIG. 5, an electrical block diagram of the amplitude modulator 253 and the RF amplifier 455 is shown, in accordance with the preferred embodiment of the present invention. The amplitude modulator 253 comprises a first, second, and third single sideband (SSB) preprocessor 255, 256, 257, each having I and Q outputs coupled to one of three QAM modulators 453. The second and third SSB preprocessors are identical to the first single sideband preprocessor 255, which is described above in detail with reference to FIG. 4. A pair of independent analog signals 441, 442, 443 is coupled to each preprocessor 255, 256, 257. A sub-channel RF signal at one of the three frequencies $F_A$, $F_B$, $F_C$ is coupled to each QAM modulator 453. The three outputs of the three QAM modulators are three low level RF sub-channel signals 571, 572, 572, which are coupled to three inputs of a summing amplifier 591. The first low level RF signal 435 generated by the frequency modulator 252 is coupled to a fourth input of the summing amplifier 591. The summing amplifier 591 isolates the outputs of the QAM modulators 453 and the output of the frequency modulator 252 each from the other. The summing amplifier further serves to couple the output of the frequency modulator 252 to the high power linear amplifier 592 and to (subsequently) combine the outputs of the QAM modulators 453 into the signal coupled to the high power linear amplifier 592. The QAM modulators are conventional QAM modulators, and the summing amplifier 591 and the high power RF amplifier are of conventional design.

Figure 6:
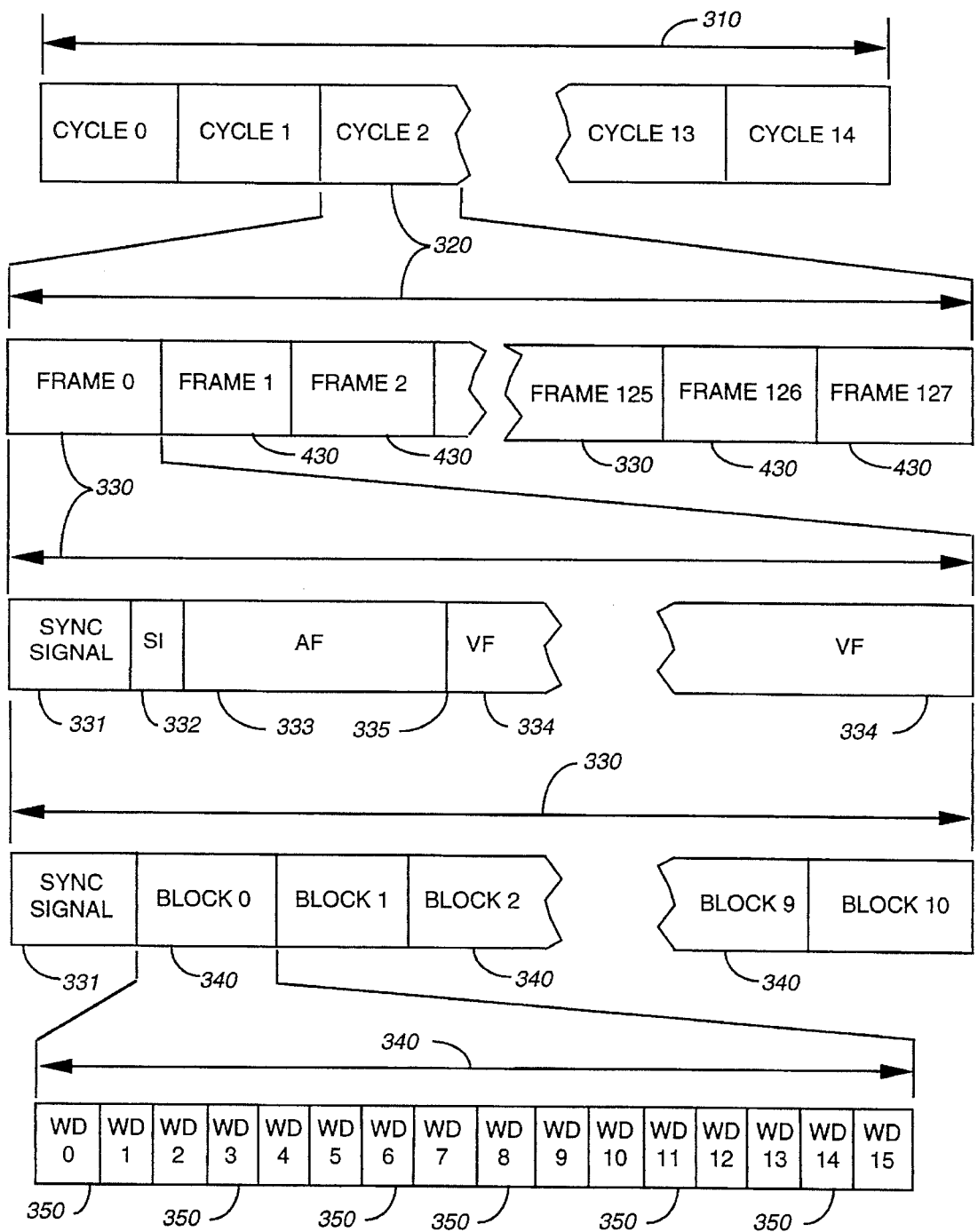
FIGS. 6, 7, and 8 are timing diagrams illustrating the transmission format of an outbound signaling protocol utilized by the radio communication system to transmit a message, in accordance with the preferred embodiment of the present invention.

Referring to FIG. 6, a timing diagram is shown which illustrates features of the transmission format of an outbound signaling protocol utilized by the radio communication system 100 of FIG. 1, and which includes details of a control frame 330, in accordance with the preferred embodiment of the present invention. Control frames 330 are also classified as digital frames 330. The signaling protocol is subdivided into protocol divisions, which are an hour 310, a cycle 320, frames 330, 430 a block 340, and a word 350. Up to fifteen 4 minute uniquely identified cycles are transmitted in each hour 310. Normally, all fifteen cycles 320 are transmitted each hour. Up to one hundred twenty eight 1.875 second uniquely identified frames including control frames 330 and analog frames 430 (described below with reference to FIG. 8) are transmitted in each of the cycles 320. Normally, all one hundred twenty eight frames are transmitted. One synchronization signal 331 lasting one hundred fifteen milliseconds and 11 one hundred sixty millisecond uniquely identified blocks 340 are transmitted in each of the control frames 330. Bit rates of 3200 bits per second (bps) or 6400 bps are usable during each control frame 330. The bit rate during each control frame 330 is communicated to the selective call radios 106 during the synchronization signal 331. When the bit rate is 3200 bps, 16 uniquely identified 32 bit words are included in each block 340, as shown in FIG. 6. When the bit rate is 6400 bps, 32 uniquely identified 32 bit words (not shown) are included in each block 340. In each 32 bit word, at least 11 bits are used for error detection and correction, and 21 bits or less are used for information, in a manner well known to one of ordinary skill in the art. The bits and words 350 in each block 340 are transmitted in an interleaved fashion using techniques well known to one of ordinary skill in the art to improve the error correction capability of the protocol.

Information is included in each control frame 330 in information fields, comprising system information in a system information field (SI) 332, one or more selective call addresses in an address field (AF) 333, and one or more vectors in a vector field (VF) 334. The vector field 334 starts at a vector boundary 335. Each vector in the vector field 334 corresponds to one of the addresses in the address field 333. The boundaries of the information fields 332, 333, 334 are defined by the words 350, not by the blocks 340, and the length of the information fields 332, 333, 334 are variable, depending on factors such as the type of system information included in the system information field 332 and the number of addresses included in the address field 333, and the number and type of vectors included in the vector field 334.

Figure 7:
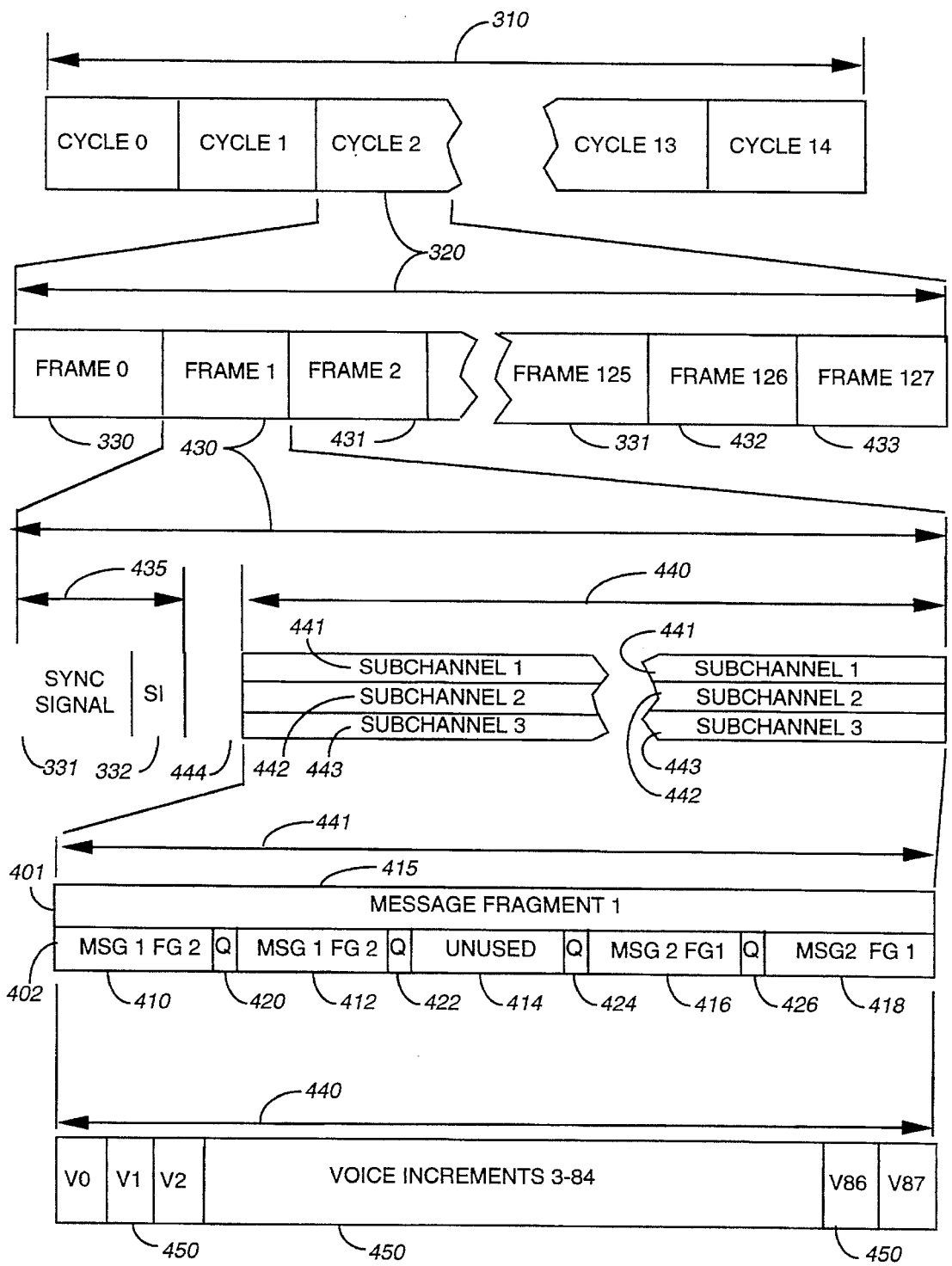

Referring to FIG. 7, a timing diagram is shown which illustrates features of the transmission format of the outbound signaling protocol utilized by the radio communication system of FIG. 1, and which includes details of a voice frame 430, in accordance with the preferred embodiment of the present invention. Voice frames 430 are also classified herein as analog frames 430. The durations of the protocol divisions hour 310, cycle 320, and frame 330, 430 are identical to those described with respect to a control frame in FIG. 6. Each analog frame 430 has a header portion 435 and an analog portion 440. The information in the synchronization signal 331 is the same as the synchronization signal 331 in a control frame 330. As described above, the header portion 435 is frequency modulated and the analog portion 440 of the frame 430, is amplitude modulated. A transition portion 444 exists between the header portion 435 and analog portion 440. In accordance with the preferred embodiment of the present invention, the transition portion 444 includes the amplitude modulated pilot sub-carriers 581, 582, 583 for each of three sub-channels 441, 442, 443.

The analog portion 440 includes the three sub-channels 571, 572, 573 which are transmitted simultaneously, and each sub-channel 571, 572, 573 includes an upper sideband signal 401 and a lower sideband signal 402. In the example illustrated in FIG. 7, the upper sideband signal 401 includes one message fragment 415, which is a first fragment of a first analog message. Included in the lower sideband 402 are four quality assessment signals 420, 422, 424, 426, four message segments 410, 412, 416, 418, and one unused segment 414. The two segments 410, 412 are segments of a second fragment of the first analog message. The two segments 416, 418 are segments of a first fragment of a second analog message. The first and second analog messages are compressed voice signals which have been fragmented for inclusion in the first sub-channel 441 of frame one 430 of cycle two 320. The second fragment of the first message and the first fragment of the second message are each split to include a quality assessment signal 420, 426, which are repeated at predetermined positions in the lower sideband 402 of each of the three sub-channels 571, 572, 573. In accordance with the preferred embodiment of the present invention, the quality assessment signals 420, 422, 424, 426 are placed at predetermined positions in the analog frame 430. However, in an alternative embodiment, the positions of the quality assessment signals 420, 422, 424, 426 are not necessarily the same from frame 430 to frame 430. In this alternative embodiment, the position of the quality assessment signal is specified in the digital information header for each frame 430 in which quality assessments signals are included which are not a predetermined positions, or in a control frame 330. This alternative embodiment, while more complex, provides additional flexibility in scheduling message fragments and quality assessment signals within an analog frame.

The predetermined placements of quality assessment signals 420, 422, 424, 426 in accordance with the preferred embodiment of the present invention are preferably different in each sub channel, which results in more accurate quality measurements since adjacent sub-channels are typically active while a given sub-channel is measuring signal quality. This approach reveals such quality degrading effects as adjacent channel interference, which are less likely to be evident when all sub-channels include the quality assessment signals simultaneously, particularly when the quality assessment signals 420, 422, 424, 426 are of the unmodulated type generated by a DC value. The smallest segment of message included in an analog frame is defined as a voice increment 450, of which 88 are uniquely identified in each analog portion 440 of an analog frame 430. The quality assessments signals are preferably transmitted as unmodulated sub-carrier pilot signals, are preferably one voice increment in duration, and preferably have a separation of no more than 420 milliseconds within an analog portion of a frame. It will be appreciated that more than one message fragment could occur between two quality assessment signals, and that message fragments are typically of varying integral lengths of voice increments.

Figure 8:
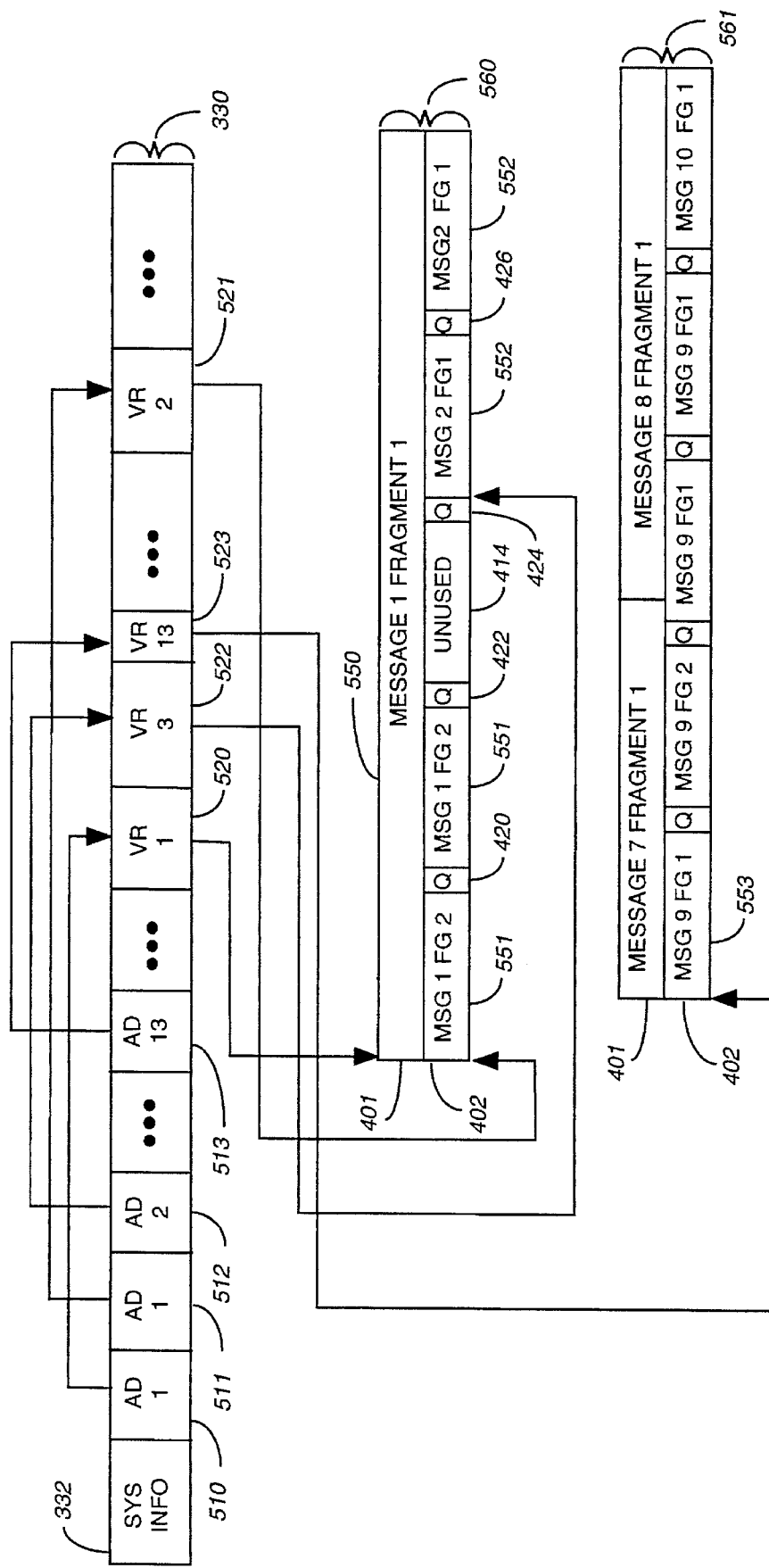

Referring to FIG. 8, a timing diagram illustrating a control frame 330 and two analog frames 430 of the outbound signaling protocol utilized by the radio communication system of FIG. 1 is shown, in accordance with the preferred embodiment of the present invention. The diagram of FIG. 8 shows an example of frame zero which is a control frame 330. Four addresses 510, 511, 512, 513 and four vectors 520, 521, 522, 523 which are in frame zero are illustrated. Two addresses 510, 511 include one selective call radio 106 address, while the other two addresses 512, 513 are for a second and third selective call radio 106. Each address 510, 511, 512, 513 is uniquely associated with one of the vectors 520, 521, 522, and 523 by inclusion of a pointer within each address which indicates the protocol position of (i.e., where the vector starts and how long it is) the associated vector. In accordance with the preferred embodiment of the present invention the vector position is provided by identifying the number of words 350 after the vector boundary 335 at which the vector starts, and the length of the vector, in words. It will be appreciated that the relative positions of the addresses and vectors are independent of each other. The relationships indicated by the pointers are illustrated by the arrows 501. Each vector 520, 521, 522, 523 is uniquely associated with a message fragment 550, 551, 552, 553 (fragments 551, 552, 553 have multiple segments as shown in FIG. 8) by inclusion of a pointer within each vector which indicates the protocol position (i.e., where the fragment starts and how long it is), including the sub channel where the associated message fragment 550, 551, 552, 553 is located. This information is used by the selective call radio to determine whether one or both sidebands of a sub-channel are to be demodulated, and where to find the information intended for the selective call radio 106. In accordance with the preferred embodiment of the present invention, the positions of the quality assessment signals are predetermined, from which the selective call radio determines segment boundaries. In an alternative embodiment, quality assessment signal positions are also included in vectors and used by the selective call radio to determine the quality assessment signal positions as well as segment boundaries.

In accordance with the preferred embodiment of the present invention the message fragment position is provided by identifying the frame 430 number (from 1 to 127), the sub-channel 441, 442, 443 number (from one to three), the sideband 401, 402, and the voice increment 450 where the message fragment starts, and the length of the message fragment, in terms of voice increments 450. For example, vector three 522 includes information which indicates that message two, fragment one 552, which is intended for selective call radio 106 having selective call address 512, is located starting at voice increment forty six 450 (the voice increments 450 are not identified in FIG. 8) of frame one 561, and vector thirteen 523 includes information which indicates that message nine, fragment one 553, which is intended for selective call radio 106 having selective call address 513, is located starting at voice increment zero 450 (the voice increments 450 are not shown in FIG. 8) of frame five 562.

It will be further appreciated that a synchronous outbound protocol other than the one described above in accordance with the preferred embodiment of the present invention can alternatively be used, when the alternate synchronous protocol includes a digital portion having at least a selective call address and a protocol position of an analog signal, and an analog portion having at least one quality assessment signal and one analog signal (or message fragment). In an alternate synchronous protocol wherein an RF carrier is double sideband modulated by only one analog signal (i.e., there are no sub carriers), the one analog signal includes quality assessment signals which are modulated and transmitted sequentially with segments of analog message fragments. It will be further appreciated that, while voice signals are described in accordance with the preferred embodiment of the present invention, other analog signals, such as modem signals, can alternatively be accommodated by the present invention.

Figure 9:
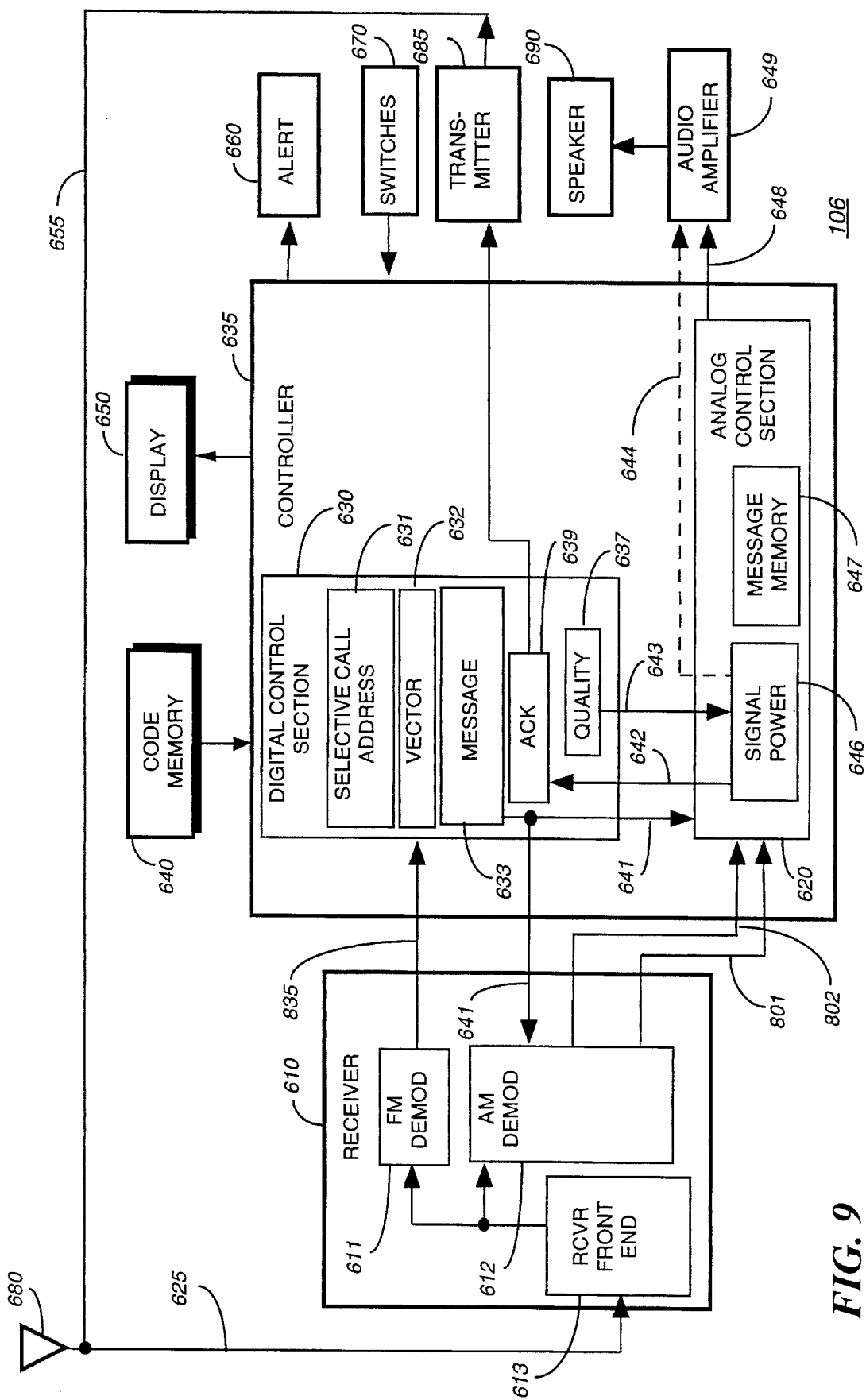
FIG. 9 is an electrical block diagram of a selective call radio with inbound message capability, in accordance with the preferred embodiment of the present invention.

Referring to FIG. 9, an electrical block diagram of the selective call radio 106 with inbound message capability is shown, in accordance with the preferred embodiment of the present invention. The selective call radio 106 comprises an antenna 680 for intercepting and transmitting radio signals, a receiver 610, a controller 635, a code memory 640, a display 650, an alert 660, switches 670, a speaker 690, a transmitter 685, and an audio amplifier 649. An intercepted signal 625 includes a control frame 330 and an analog frame 430 of a cycle 320 of the protocol in accordance with the preferred embodiment of the present invention. The control frame 330 and analog frame 430 described above with reference to FIGS. 6, 7, and 8 are used herein below as an example to describe the details of the selective call radio 106. The antenna 680 is coupled to a receiver 610 and a conventional transmitter 685. The receiver 610 is coupled to the controller 635. The controller 635 is coupled to the code memory 640, the display 650, the alert 660, the switches 670, the audio amplifier 649, and the transmitter 685. The intercepted signal 625 is coupled to a front end 613 of the receiver 610 wherein the intercepted signal 625 is received and converted, which includes filtering to remove undesirable energy at off channel frequencies, amplification of the filtered signal, and conversion of the carrier frequency of the received signal to an intermediate frequency (IF) in a conventional manner well known to one of ordinary skill in the art.

The resulting IF signal is coupled to a frequency modulation (FM) demodulator 611 and a double sideband amplitude modulation (AM) demodulator 612. The FM demodulator 611 recovers the control frame 330 and header, or digital portion 435 of the analog frame. The AM demodulator 612 recovers the two independent analog signals 401, 402, respectively, from the upper and lower sideband of a sub-channel of the intercepted signal 625 at one of the frequencies $F_A$, $F_B$, $F_C$, at times indicated by a message received signal 641 which is generated during the analog portion 440, of the analog frame 430 when portions of the analog frame 430 intended for the selective call radio 106 are being received. The demodulated control frame 330 and header 435 are coupled to a digital control section 630 of a controller 635, and the demodulated analog signals 401, 402, are coupled to an analog control section 620 of the controller 635.

The controller 635 comprises a digital control section 630 and an analog control section 620. The digital control section 630 comprises a selective call address element 631, a vector element 632, an outbound message element 633, an acknowledgment element 639, and a quality element 637. The analog control section 620 comprises a signal power element 646 and a message memory 647. The demodulated control frame 330 and header 435 include the digital information transmitted in the control frame 330 and analog frame 430, with errors possibly induced during the propagation of the radio signal 625. The digital control section recovers the information in the control frame 330 and demodulated header 435 using error correction and detection techniques well known to one of ordinary skill in the art. The controller 635 is coupled to a code memory 640, in which is stored a short (one word) address and a long (two word) address assigned to the selective call radio 106, which are also referred to herein as embedded addresses. In this example, the embedded addresses include an address which is equivalent to the selective call address 510 transmitted in the received analog frame 430. When the digital control section 630 determines that the control frame 330 information is sufficiently error free, the selective call address element 631 and the vector element 632 function interactively to identify the positions within the recovered frame 430 of the analog message segments 410, 412, 415, 416, 418, and identify which selective call addresses 510, 511, 512 are associated with which message segments 410, 412, 415, 416, 418, using the address and vector information in the control frame 330.

The selective call address element 631 compares each outbound selective call address in the address field 333 of the recovered control frame 330 to the embedded addresses. When the selective call address element 631 determines that the outbound selective call address 510 in the recovered frame 330 matches the embedded selective call address, the message element 633 interacts with the vector element 632 and identifies the analog message segments 415, 410, and 412 as being intended for the selective call radio 106 and generates the message received signal 641 which is coupled to the AM demodulator 612 and the analog control section 620 for identifying the analog segments 415, 410, 412; that is to say, for identifying those time periods when the analog segments 415, 410, 412 are being received. Also, when the selective call address element 631 determines that the outbound selective call address 510 in the recovered frame 330 matches the embedded selective call address, the quality element 637 generates a quality signal indication 643, which is coupled to the signal power element 646 of the analog control section 620. The quality signal indication 643 identifies the quality assessment signals 420, 422, 424, and 426; that is to say, for identifying those time periods when the quality assessment signals 420, 422, 424, and 426 are being received.

The analog control section 620 processes the independent analog information portions 401, 402 coupled from the receiver 610 to convert the analog segments 415, 410, 412 from analog to digital form and store them in the message memory 647 in digital form, in response to the message received signal 641. In response to the quality signal indication 643, the signal power element 646 of the analog control section 620 measures the quality assessment signals 420, 422, 424, 426 and determines a signal quality value from the measurements, as described below. When the signal quality value exceeds a predetermined number, an acknowledge indication signal 642 is coupled to the acknowledgment element 639 of the digital control section 630, which generates an acknowledgment response message signal and a sensible alert signal. When the signal quality value does not exceed a first predetermined level, a non-acknowledge indication signal 642 is generated, the acknowledgment element generates a non-acknowledgment response message signal, and the analog fragments are eventually retransmitted by the fixed site 115 in a subsequent analog frame 430. When all the analog segments for message one 415, 410, 412 have been received by the selective call radio 106, the analog control section 620 recovers and appends the message segments 415, 410, 412 together from the message memory 647, performs decompression of the analog signal and couples the decompressed signal 648 to the audio amplifier 649. (An instance can exist wherein analog message fragments of an analog message are in multiple analog frames 430, in which instance, the analog control section 620 preferably assembles all of the segments before coupling the message to the audio amplifier 649.) According to the setting of the control switches 670, the sensible alert signal activates the alert device 660, which in accordance with the preferred embodiment of the present invention is a tone alert device, but could alternatively be a tactile or vibratory alert device.

Various techniques are possible for implementing the acknowledge and non-acknowledge decision. For example, an entire message can be acknowledged or non-acknowledged based on whether all or a majority of the quality assessment measurements meet the predetermined threshold, or level. Also, individual fragments of a longer message can be acknowledged or non-acknowledged based on one or more quality assessment signals within that fragment, thus eliminating the need for all fragments to be retransmitted when only a few are corrupted.

The acknowledgment response message is coupled to the transmitter 685, wherein the acknowledgment response message is used to modulate an RF carrier an generate an RF transmit signal 655, which is coupled to the antenna 680 for transmission to the system controller 102.

When no address in the recovered frame 430 matches an embedded selective call address, the digital control section 630 ceases further processing of the demodulated signal 435 and puts the selective call radio 106 into a power down mode until a later time when a subsequent predetermined digital or analog frame 330, 430 is transmitted which potentially includes outbound messages for the selective call radio 106.

In accordance with the preferred embodiment of the present invention, when the quality assessment signal is a DC level resulting in an unmodulated pilot, the measurement is performed by finding the average energy of the sub-channel carrier and the average energy in the sideband containing the quality assessment signal (which will be noise since no information is present) during the duration of the quality assessment signal. The ratio of these two energies represents the received signal-to noise ratio during the quality assessment signal and is the signal quality value in the preferred embodiment. In an alternative, when the quality assessment signal is a predetermined analog signal such as a tone, the signal energy and noise plus distortion energy are separated by conventional filtering techniques, and the signal quality level is equal to the ratio of the signal energy to the noise plus distortion energy during the duration of the quality assessment signal.

Figure 10:
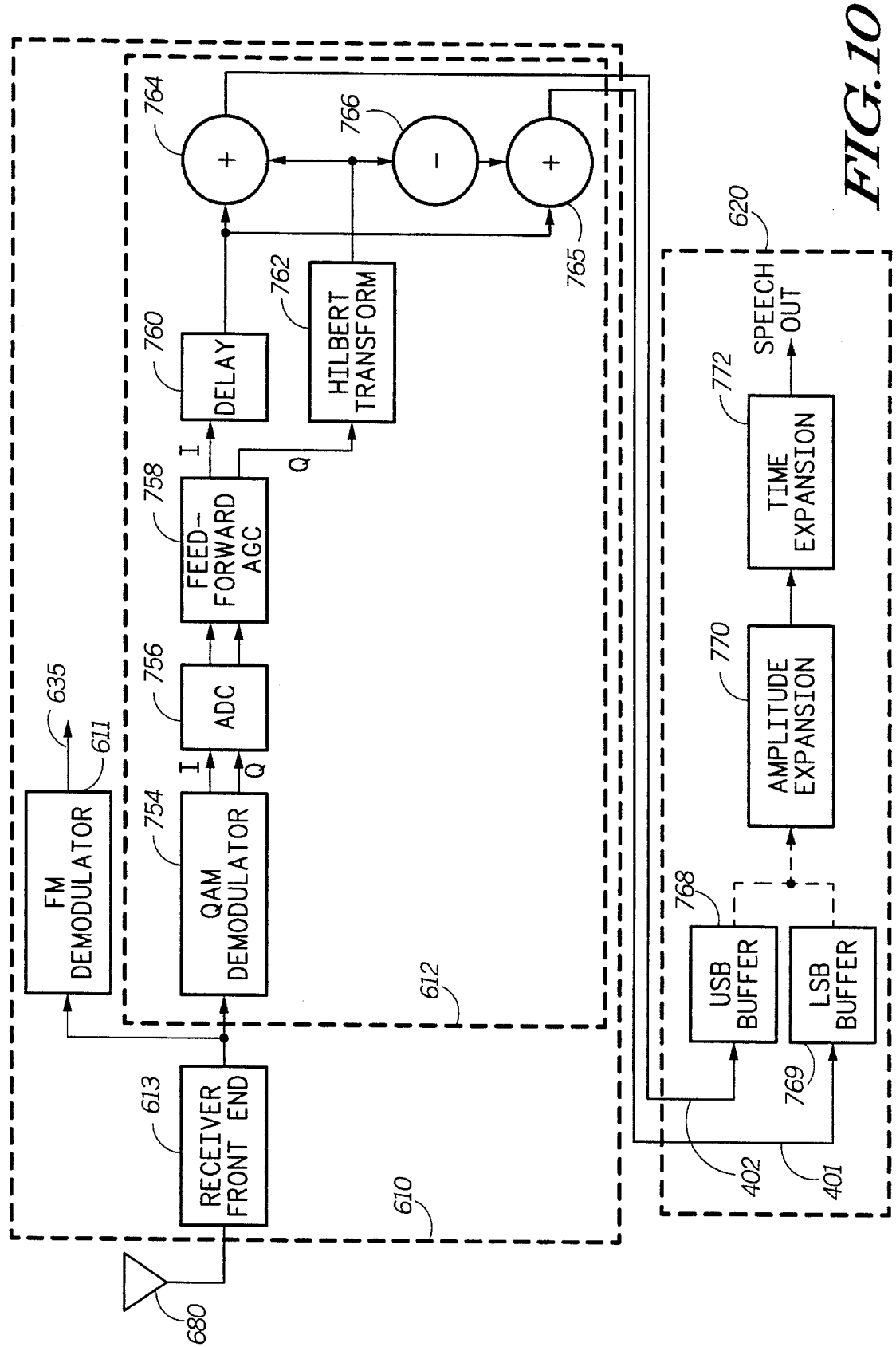
FIG. 10 is an electrical block diagram of portions of the selective call radio, in accordance with the preferred embodiment of the present invention.

FIG. 10 is an electrical block diagram of the receiver 610 and portions of the analog control section 620, in accordance with the preferred embodiment of the present invention. The receiver of FIG. 10 comprises the antenna 680, receiver front end 613, a QAM demodulator 754, an ADC 756, a feed-forward AGC 758, a time delay element 760, and a Hilbert transform filter 762 arranged and constructed as shown in FIG. 10. A QAM demodulator 754 detects I and Q components of the intermediate frequency signal recovered from the two sidebands of one of the sub-channel frequencies $F_A$, $F_B$, $F_C$. An analog-to-digital converter (ADC) 756 converts the I and Q components to digital form for further processing. Digital signal processing is the preferred method, but the same functions could also be performed with analog techniques or a combination of analog and digital techniques. Other methods of demodulation, e.g., a sigma-delta converter, or direct digital demodulation, would accomplish the same purpose as the QAM demodulator 754 and ADC 756.

A feed forward automatic gain control (AGC) element 758 uses the pilot sub-carrier, transmitted along with the time compressed speech signal, as a phase and amplitude reference signal to substantially cancel the effects of amplitude and phase distortions occurring in the transmission channel. The outputs of the feed forward automatic gain control 758 are corrected I and Q components of the received signal. The corrected Q component is applied to a Hilbert transform filter 762, and the corrected I component is applied to a time delay element 760 which has the same delay as the Hilbert transform filter 762 but does not otherwise affect the signal. The output of the Hilbert transform filter 762 is added to the output of the time delay element 760 (through summing element 764) to produce the recovered time compressed speech signal corresponding to the first half of the speech message which was transmitted on the upper sideband 401. The output of the Hilbert transform filter 762 is subtracted (766) from the output of the time delay element 760 to produce the recovered time compressed speech signal corresponding to the second half of the speech message which was transmitted on the lower sideband 402.

The two recovered time compressed speech signals 401, 402 are stored in either respective upper sideband and lower sideband buffers 768, 769 which are a portion of the message memory 647, until the entire message has been received. Then the signal corresponding to the first half of the message and the signal corresponding to the second half of the message are applied sequentially to the amplitude expansion element 770. An amplitude expansion element 770 works in conjunction with the amplitude compression element 411 of FIG. 4 to perform the companding function.

A time expansion element 772 works in conjunction with the time compression element 409 of FIG. 4 and preferably reconstructs the speech into its natural time frame or other time frames as other applications may suggest or require. The time compression method is preferably similar to WSOLA, but other methods could be used, so long as complementary methods are used in the transmitter and receiver. Other configurations can produce essentially the same results. For example, the amplitude compression could be performed after the time compression, or omitted altogether and the device would still perform essentially the same function.

As with the implementation of the transmitter of FIGS. 2, 4, and 5, many of the components in FIGS. 9 and 10 including, but not limited to the AGC 758, the QAM demodulator 754, the summation elements 764, 766, the amplitude expansion element 770, and the time expansion element 772, can be implemented using firmware elements which control the operation of a conventional microprocessor, which can be a digital signal processor. These listed elements are uniquely combined to demodulate the sub-channel signal having two sidebands with independent signal information in each sideband, and a pilot sub-carrier. The elements themselves are conventional.

The audio amplifier 649 comprises conventional circuits. Unique firmware elements designed using conventional programming techniques which control a conventional microprocessor provide the functions described herein for the digital control section 630 and analog control section 620, including the selective call address element 631, the vector element 632, the outbound message element 633, the acknowledgment element 639, the quality element 637, and the signal power element 646. The message memory 647 is preferably a direct memory accessible static random access memory, which allows digitized analog samples to be coupled from the AM demodulator 610 and stored directly into the memory 647, without significant real time loading of the processor which supports the elements in the controller 635. The processor which supports the elements in the controller 635 can then access the stored digitized analog samples to support the amplitude expansion element 770 and the time expansion element 772. The display 650 is a liquid crystal display of a type well known to those skilled in the art, and the antenna 680, switches 670, speaker 690, and alert device 660 are devices also well known to those skilled in the art. The FM front end, FM demodulator, and transmitter 685 are conventional low power radio sections.

It will be appreciated that the functions described above are preferably implemented in a single microprocessor, but alternatively may be implemented in separate microprocessors.

It will be further appreciated that instead of providing a proactive non-acknowledgment when the signal quality level is below the predetermined number, the digital control section alternatively can be designed to send no acknowledgment, inasmuch as the system controller 102 is designed to retransmit information when no acknowledgment is received within a acknowledgment time period. In accordance with the preferred embodiment of the present invention the technique of determining an acknowledgment or non-acknowledgment for an analog signal such as a voice or compressed voice message or fragment thereof is unique in that an audio signal quality level is measured during the transmission of the analog information. The technique is further unique in that the quality assessment signal can be transmitted during a first analog information fragment when independent first and second analog signals are used with a sub channel having two single sideband amplitude modulated signals for simultaneous transmission of the independent analog signals, thereby decreasing the overhead of including the quality assessment signals as compared to including the quality assessment signals on both single sidebands.

In accordance with a second alternate embodiment of the present invention, the selective call radio 106 operates in a radio communication system 100, and the selective call radio 106 uses the signal quality value and a measurement of a short term average signal power (e.g., 20 milliseconds) in the information segments 415, 410, 412, 416, 418 to generate a squelch signal 644. In the second alternative embodiment, the quality assessment signal is the power measurement made during silence in a voice message, or during a quality assessment signal generated as unmodulated audio (using the DC value), which is a noise floor value. A long term average of the noise floor (e.g., 200 milliseconds) is compared with the short term average, and when the information signal power short term average is less than a threshold based on the noise floor long term average, the squelch signal 644, which is coupled to the audio amplifier 649, mutes the audio signal being generated by the audio amplifier 649. It will be appreciated that this unique squelch function is superior to prior art squelch functions which are dependent on an IF signal strength, in that the second alternative embodiment of the present invention measures the audio quality essentially during the analog information signal, and can therefore distinguish problems such as distortion caused by intermodulation of RF signals which prior art squelch functions do not detect. This technique for providing a squelch function is particularly useful in a radio communication system 100 which does not have a reverse channel which can be used for acknowledgments, because the technique can enhance the intelligibility of a marginal signal by removing portions which may have high noise content, allowing other portions to be better understood.

Figure 11:
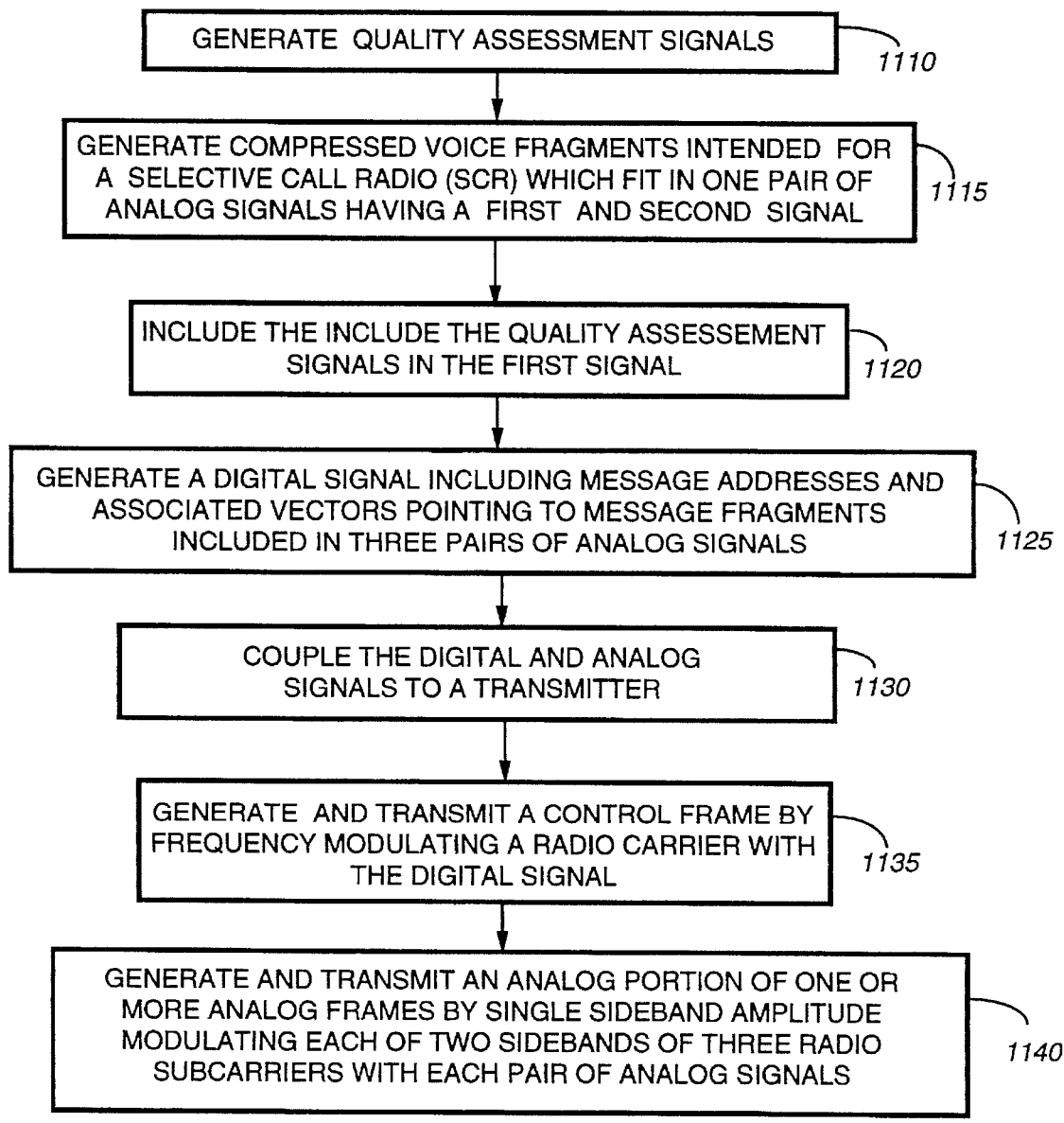
FIGS. 11, 12, and 13 are flow charts showing a method used in the radio communication system for determining the signal-quality level of an analog signal received by the selective call radio, in accordance with the preferred embodiment of the present invention.
Figure 13:
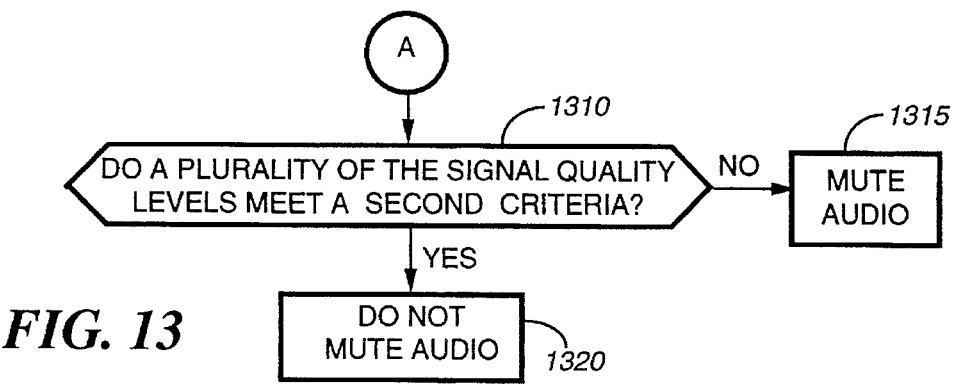
Figure 12:
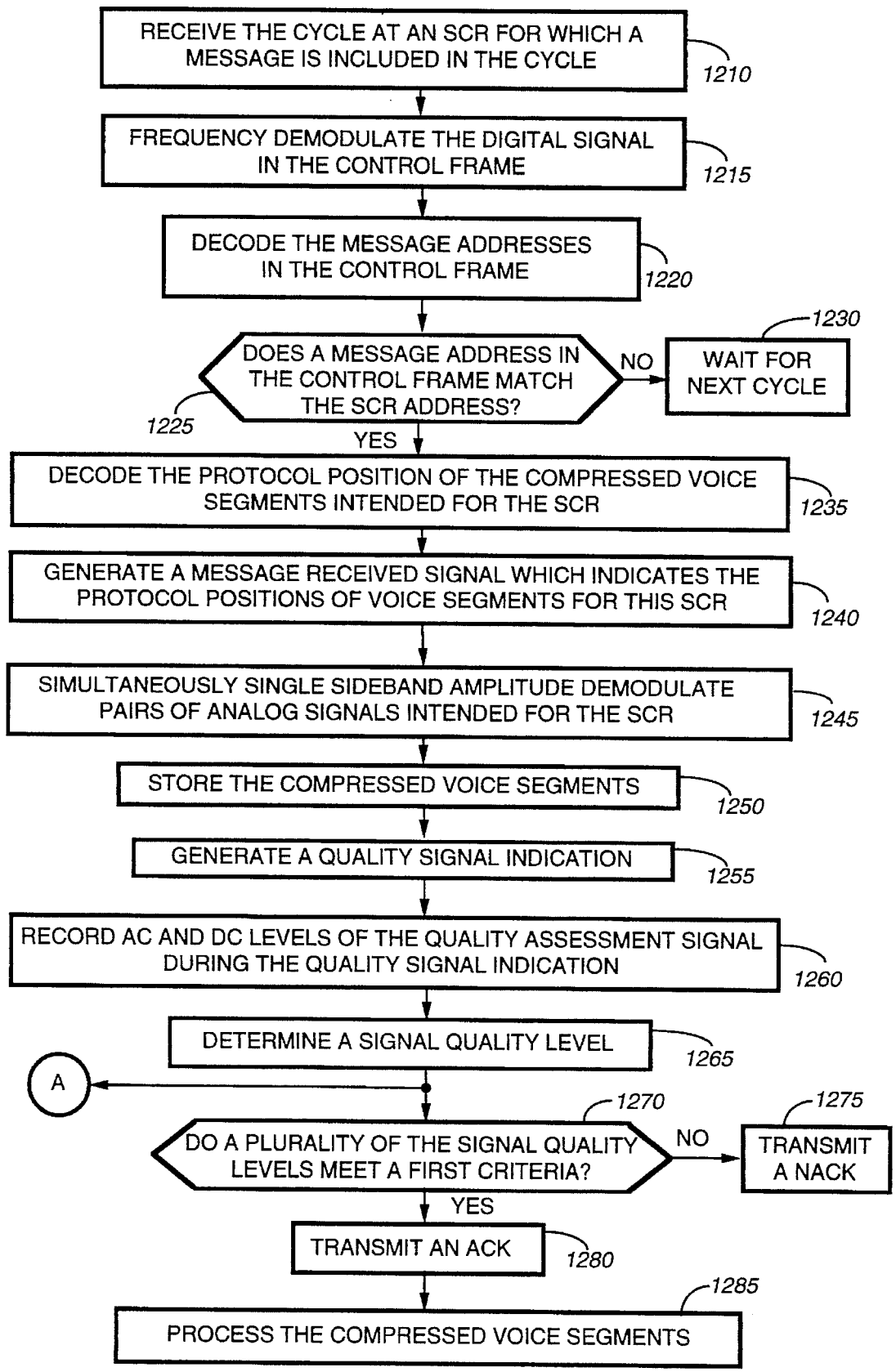

Referring to FIGS. 11, 12, and 13, flow charts showing a method used in the radio communication system 100 for determining the signal quality level of an analog signal received by a selective call radio are shown, in accordance with the preferred embodiment of the present invention. The flow chart in FIG. 11 shows a portion of the method used in the fixed site 115. At step 1110 quality assessment signals are generated by the quality means 216. Next, at step 1115 the compression means 215 generates compressed voice message fragments intended for a selective call radio 106, and a portion of the compressed voice fragments are included in a first and second analog signal of a first pair of analog signals at step 1120. As appropriate for improved throughput, fragments of compressed voice messages intended for other selective call radios 106 are also included in the first pair of analog signals. Next, at step 1125 the quality assessment signal is assembled by the message handler 204 into the first analog signal a predetermined number of times, with the message fragments being broken into segments as required to intersperse the quality assessment signals between the fragments. Message fragments and quality assessment signals for other pairs of analog signals are also assembled by the message handler 204 to fill out a transmission cycle as appropriate, without including message fragments for any one selective call radio 106 more than once in each set of three pairs of signals assembled for a single analog frame. Next, at step 1130 the assembled digital and analog frame information is coupled to the cell site controller 202 which converts the compressed analog signals to digital form using a digital to analog conversion technique well known to one of ordinary skill in the art and couples the information to a radio transmitter/receiver 103 for radio transmission. The radio transmitter/receiver 103 converts the digital form of the analog signals back to compressed analog signals using digital to analog conversion.

Next, at step 1135 the radio transmitter/receiver 103 uses the digital information to frequency modulate a radio carrier, producing a digital frame of transmission cycle of the outbound radio signal which is transmitted. Next, at step 1140 the radio transmitter/receiver 103 uses the six analog signals of an analog frame information to amplitude modulate radio sub-carriers, by using the first and second analog signals of each of the three pairs of analog signals to single sideband modulate each of three sub-carrier frequencies, thereby producing an analog portion of an analog frame of the transmission cycle, which is transmitted. The first and second analog signals are modulated onto, respectively lower and upper sidebands of each sub-carrier. It will be appreciated that, in accordance with the preferred embodiment of the present invention, the quality assessment signal is converted from the preferred predetermined DC level to a pilot sub-carrier when the single sideband modulation of the first analog signal of each pair is amplitude modulated.

The flow chart in FIGS. 12 and 13 shows a portion of the method used in the fixed site 115. At step 1210 the radio signal which includes an analog message is received by a selective call radio 106. Next, at step 1215 the frequency demodulator 611 of the selective call radio 106 frequency demodulates the control frame. Next, the digital control section 630 of the controller 635 decodes the control frame at step 1220. Next, at step 1225, the decoded information in the control frame is tested for a selective call address which matches a selective call address stored in the code memory 640, either matching the stored address exactly or being different only at bits which indicate the received selective call address is a group address for the selective call radio 106. When no received selective call address substantially matches the stored address at step 1225, as described above, the digital control section 630 puts the selective call radio 106 into a power down mode and awaits another cycle, at step 1230. When one or more received selective call addresses do substantially match the stored address at step 1225, as described above, the digital control section 630 decodes the vectors associated with the matching selective call addresses, determines the protocol positions of associated analog message fragments, at step 1235, and generates a message received signal 641 which includes the protocol positions, at step 1240. The AM demodulator 612 demodulates, at step 1245, the upper and lower sidebands of one of the sub-carriers for each message fragment sent to the selective call radio 106, when indicated by the message received signal 641. At step 1250, the selective call radio converts the compressed analog message fragments to digital form using analog to digital conversion and stores the fragments. At step 1255, the digital control section 630 generates a quality signal indicator which is coupled to the signal power element 646 of the analog control section 620. At step 1260 the signal power element 646 determines, in accordance with the preferred embodiment of the present invention, average DC levels and average AC power levels of the first analog signal both during the receipt of the quality assessment signals 420, 422, 424, 426 and during the receipt of the portion of the message segments 415 410 412, 416, 418.

In accordance with the preferred embodiment of the present invention an average signal to noise measurement, which is the signal quality level, is determined at step 1265 from the AC level (noise power) measured during the quality assessment signal (which is unmodulated audio), and the AC level measured during the message segments (signal power). When the power element 646 determines that a plurality of signal quality levels of all quality assessment signals which are transmitted substantially during any fragment of a message within a pair of analog signals transmitted in one frame meet a criterion at step 1270, the power element 646 generates an acknowledge indication signal 642. In response to the acknowledge indication signal 642, the digital control section 630 generates an acknowledgment message signal at step 1280. When the criterion is not met at step 1270, the power element 646 generates an non-acknowledge indication signal 642. In response to the non-acknowledge indication, the digital control section 630 generates an acknowledgment message at step 1275. The criterion in accordance with the preferred embodiment of the present invention is that the signal quality levels of a majority of the quality assessment signals which are transmitted substantially during any fragment of a message within a pair of analog signals transmitted in one frame exceeds the first predetermined level. The quality assessment signals which are substantially during any fragment of a message within a pair of analog signals are those quality assessment signals which are at the beginning or end of any fragment or segment of the message in the pair of analog signals.

It will be appreciated that other criteria could be used as appropriate to accommodate various design choices such as the periodicity and type of quality assessment signals. Alternative types of quality assessment signal are for example, a predetermined pure tone, a predetermined sequence of tones, and/or a null signal, which can be analyzed by conventional circuitry or by a digital signal processor to determine a signal to noise ratio at one or more frequencies. When all fragments of a message have been acknowledged at step 1280, the complete message is further processed at step 1285, by the analog control section which decompresses the analog fragments and segments and performs a digital to analog conversion of them in the order of their original sequence to generate a continuous analog signal 648 which is amplified by the analog amplifier 649 and coupled to a speaker 690 to generate an audible signal. In an alternative embodiment of the present invention, the signal power element 646 generates a mute indication 644 when at step 1310 a short term (for example, 20 milliseconds) average AC signal power of the first analog signal determined at step 1260 is less than a threshold based on a long term (for example 200 milliseconds) average of the noise power. The mute indication 644 is coupled to the audio amplifier to mute the audio signal generated by the audio amplifier 649 at step 1315 while portions of the decompressed message corresponding substantially to the positions of the quality assessment signals corresponding to the successive quality assessment signals are being regenerated. Otherwise, the signal is unmuted, at step 1320.

It will be appreciated that the selective call radio 106 can alternatively include three AM demodulators 612, thereby allowing message fragments for any one selective call radio 106 to be included in any sub-channel.

By now it should be appreciated that there has been provided a method and apparatus which effectively measures the quality of an analog signal received by a selective call radio used in a radio communication system which transmits outbound analog signals using amplitude modulation of a radio carrier or radio sub-carriers in a frame of a synchronous signaling protocol. The quality level is measured using audio signals, thereby providing improved measurement of the quality level in comparison to techniques which measure RF signal strength. The overhead imposed by the quality assessment signals is reduced in systems using independent analog signals on both sidebands of a double sideband signal, compared to using one analog signal with either single or double sideband modulation, and is further reduced in systems using two or more sub-carriers to provide higher multiples of sidebands.

We claim:

1. A fixed site used in a radio communication system, wherein the fixed site is for generating an outbound radio signal which includes periodic synchronous cycles, wherein a cycle includes an analog portion within which a signal quality level of a first information signal is determined by a selective call radio, the fixed site comprising:

a system controller, comprising:

analog information means, for generating the first information signal;

quality signal means, for generating a quality assessment signal;

a message handler, coupled to said analog information means and quality signal means, for determining a selective call radio address of the selective call radio and assembling cycle information including the selective call radio address, the first information signal, and the quality assessment signal; and a cell site controller, coupled to said message handler, for sending the cycle information to a transmitter over a communication link;

a radio transmitter, coupled to said cell site controller, comprising;

a transmitter controller for receiving the cycle information;

a frequency modulator for transmitting a control frame generated by frequency modulating a radio carrier with the selective call radio address; and an amplitude modulator for transmitting the analog portion of an analog frame, wherein the analog portion is generated by amplitude modulating the radio carrier with the first information signal and the quality assessment signal.

2. The fixed site according to claim 1, wherein said amplitude modulator generates the analog portion by amplitude modulating a first of 2N sidebands of N modulated sub-carriers with the first information signal and simultaneously modulates a second of the 2N sidebands with the quality assessment signal.

3. The fixed site according to claim 1, wherein the message handler includes a plurality of the quality assessment signals within the analog portion and the transmitter transmits the plurality of the quality assessment signals with no more than 420 milliseconds between successive transmissions quality assessment signals.

4. A selective call radio for use in a radio communication system, wherein the radio communication system transmits an outbound radio signal which includes periodic synchronous cycles, the selective call radio comprising:

a receiver front end for receiving and converting a cycle of the outbound radio signal, wherein the cycle has a digital portion and an analog portion which are, respectively, frequency modulated by a digital signal and amplitude modulated by an analog signal, and wherein the analog signal includes a quality assessment signal and an information signal, and wherein the digital signal includes a message address;

a frequency modulation (FM) demodulator, coupled to said receiver front end, for demodulating the outbound radio signal to recover the digital signal;

an amplitude modulation (AM) demodulator, coupled to said receiver front end, for demodulating the outbound radio signal to recover the analog signal;

a digital control section, coupled to said FM demodulator, for decoding the message address, for generating a message received signal when the message address matches a selective call address stored in the selective call radio within predetermined limits, and for generating a quality signal indication while the quality assessment signal is being received;

an analog section, coupled to said digital control section and said AM demodulator, for processing the analog signal in response to the message received signal, for recording at least one measurement of the quality assessment signal during the quality signal indication, and for determining a signal quality level of the information signal from the at least one measurement of the quality assessment signal; and an alert device, coupled to said digital control section, for generating a sensible alert in response to the signal quality level.

5. The selective call radio according to claim 4, wherein the analog portion includes at least two independent analog signals, each of which is amplitude modulated on a single sideband of at least one sub-carrier of the outbound radio signal, and wherein the quality assessment signal and the information signal are transmitted simultaneously on different single sidebands, and wherein said AM demodulator further comprises:

at least two single sideband demodulators for simultaneously demodulating the quality assessment signal and the information signal.

6. The selective call radio according to claim 4, wherein the analog section comprises a analog to digital converter for generating the at least one measurement as a plurality of digitized analog samples of the quality assessment signal, and further comprises a power element for determining the signal quality level as a signal to noise ratio from the plurality of digitized analog samples.

7. The selective call radio according to claim 4 wherein the digital control section comprises an acknowledge element, coupled to the analog section, for generating an acknowledgment when the signal quality level exceeds a first predetermined level, and wherein the selective call radio further comprises a transmitter, coupled to the acknowledge element, for transmitting the acknowledgment.

8. The selective call radio according to claim 7 wherein the acknowledgment includes the signal quality level.

9. The selective call radio according to claim 7, wherein the outbound radio signal includes a plurality of the quality assessment signals transmitted substantially during the information signal, and which are transmitted with no more than 420 milliseconds between successive quality assessment signals, and the acknowledge element generates the acknowledgment when a plurality of signal quality levels determined from the corresponding plurality of quality assessment signals meet a predetermined criterion.

10. The selective call radio according to claim 4, wherein the analog section derives an audio signal having an average signal power from the information signal, wherein the signal quality level is an average noise floor, and wherein the selective call radio further comprises an audio section for amplifying the audio signal and muting the audio signal when the average signal power is less than the average noise floor, and wherein the selective call radio further comprises a speaker, coupled to said audio section, for transducing the audio signal to an audible signal.

11. The selective call radio according to claim 10, wherein the outbound radio signal includes a plurality of the quality assessment signals transmitted substantially during the information signal, and which are transmitted with no more than 420 milliseconds between successive quality assessment signals, and wherein in the audio signal is muted when the average signal power is less than a threshold based on a plurality of average noise floors.

12. A method used in a radio communication system for determining a signal quality level of an analog signal received by a selective call radio within an analog portion of a cycle of an outbound radio signal, wherein the radio communication system transmits periodic synchronous cycles in the outbound radio signal, the method comprising:

within a system controller, the steps of:
generating a digital signal which includes a message address of the selective call radio;
generating the analog signal which includes a quality assessment signal and an information signal; and
coupling said digital and analog signals to a transmitter;

wherein the method further comprises, within a radio transmitter, the step of transmitting a cycle including a digital portion generated by frequency modulating a radio carrier with the digital signal and an analog portion generated by amplitude modulating a radio carrier with the analog signal, and wherein the method further comprises, within the selective call radio, the steps of:
receiving said digital and analog portions;
frequency demodulating the digital signal;
amplitude demodulating the analog signal;
decoding the message address;
generating a message received signal when the message address matches a selective call address stored in the selective call radio within predetermined limits;
generating a quality signal indication while the quality assessment signal is being received;
processing the information signal in response to the message received signal;
recording at least one measurement of the quality assessment signal during the quality signal indication;
determining a signal quality level of the information signal from the at least one measurement of the quality assessment signal; and
generating a sensible alert in response to the signal quality level.

13. A method used in a selective call radio, wherein the selective call radio is for use in a radio communication system which transmits periodic synchronous cycles in an outbound radio signal, the method comprising the steps of:
receiving a radio signal including a cycle, wherein the cycle has a digital portion and an analog portion sequentially transmitted which are, respectively, frequency modulated by a digital signal and amplitude modulated by an analog signal, and wherein the analog signal includes a quality assessment signal and an information signal, and wherein the digital signal includes a message address;
frequency demodulating the digital signal;
amplitude demodulating the analog signal;
decoding the message address;
generating a message received signal when the message address matches a selective call address stored in the selective call radio within predetermined limits;
generating a quality signal indication while the quality assessment signal is being received;
processing the information signal in response to the message received signal;
recording at least one measurement of the quality assessment signal during the quality signal indication;
determining a signal quality level of the information signal from the at least one measurement of the quality assessment signal; and
generating a sensible alert in response to the signal quality level.

14. The method according to claim 13, wherein the analog portion includes at least two independent analog signals, each of which is amplitude modulated on a single sideband of at least one sub-carrier of the radio signal, and wherein the quality assessment signal and the information signal are transmitted simultaneously on different single sidebands, and wherein said step of frequency demodulating the digital signal further comprises the step of:
simultaneously amplitude demodulating the quality assessment signal and the information signal.

15. The method according to claim 13, wherein the step of recording the at least one measurement comprises the step of:
generating the at least one measurement as a plurality of digitized analog samples of the quality assessment signal, and
wherein the step of determining the signal quality level comprises the step of:
determining the signal quality level as a signal to noise ratio from the plurality of digitized analog samples.

16. The method according to claim 13, further comprising the steps of:
generating an acknowledgment when the signal quality level exceeds a first predetermined level; and transmitting the acknowledgment.

17. The method according to claim 16, wherein in said step of generating the acknowledgment, the signal quality level is included in the acknowledgment.

18. The method according to claim 16, wherein the radio signal includes a plurality of the quality assessment signals transmitted substantially during the information signal, and which are transmitted with no more than 420 milliseconds between successive quality assessment signals, and wherein in the step of generating the acknowledgement, the acknowledgment is generated when a plurality of signal quality levels determined from the corresponding plurality of quality assessment signal meet a first predetermined criterion.

19. The method according to claim 13, further comprising the steps of deriving an audio signal from the information signal;

measuring an average signal power of the audio signal;

amplifying the audio signal;

muting the audio signal when the average signal power is less than an average noise floor which is based on the signal quality level; and transducing the audio signal to an audible signal.

20. The method according to claim 19, wherein the radio signal includes a plurality of the quality assessment signals transmitted substantially during the information signal, and which are transmitted with no more than 420 milliseconds between successive quality assessment signals, and wherein in the step of muting, the audio signal is muted when the average signal power is less than a threshold based on a plurality of average noise floors.

* * * * *